US012638558B2

(12) United States Patent
Phare et al.

(10) Patent No.: US 12,638,558 B2
(45) Date of Patent: May 26, 2026

(54) HYBRID TWO-DIMENSIONAL STEERING LIDAR

(71) Applicant: Voyant Photonics, Inc., New York, NY (US)

(72) Inventors: Christopher T. Phare, New York, NY (US); Sajan Shrestha, New York, NY (US)

(73) Assignee: Voyant Photonics, Inc., New York, NY (US)

( * ) Notice: Subject to any disclaimer, the term of this patent is extended or adjusted under 35 U.S.C. 154(b) by 1138 days.

(21) Appl. No.: 17/672,162

(22) Filed: Feb. 15, 2022

(65) Prior Publication Data

US 2022/0244360 A1 Aug. 4, 2022

Related U.S. Application Data

(63) Continuation-in-part of application No. 17/002,901, filed on Aug. 26, 2020, now abandoned.

(51) Int. Cl.
| | |
|---|---|
| *G01S 7/481* | (2006.01) |
| *G01S 17/89* | (2020.01) |
| *G02B 26/12* | (2006.01) |

(52) U.S. Cl.
CPC .......... *G01S 7/4817* (2013.01); *G01S 7/4812* (2013.01); *G01S 7/4815* (2013.01); *G01S 17/89* (2013.01); *G02B 26/122* (2013.01)

(58) Field of Classification Search
CPC .... G01S 7/4817; G01S 7/4812; G02B 26/122
See application file for complete search history.

(56) References Cited

U.S. PATENT DOCUMENTS

| | | | |
|---|---|---|---|
| 8,311,374 B2 | 11/2012 | Hochberg et al. | |
| 10,031,212 B2 | 7/2018 | Nakamura | |
| 10,345,518 B1 | 7/2019 | Yap et al. | |
| 2003/0011888 A1* | 1/2003 | Cox | G02B 7/04 |
| | | | 257/E31.128 |
| 2005/0052751 A1 | 3/2005 | Liu et al. | |
| 2008/0225105 A1 | 9/2008 | Kudo | |
| 2013/0234009 A1 | 9/2013 | Guldimann | |
| 2015/0207990 A1 | 7/2015 | Ford et al. | |
| 2016/0308327 A1 | 10/2016 | Volodin | |

(Continued)

FOREIGN PATENT DOCUMENTS

WO    WO20192051641    * 10/2019

OTHER PUBLICATIONS

International Search Report issued on PCT International Patent Application No. PCT/US2021/045849 on Nov. 17, 2021.

(Continued)

*Primary Examiner* — Yuqing Xiao
*Assistant Examiner* — Zhengqing Qi
(74) *Attorney, Agent, or Firm* — Stratford Group Ltd.

(57) ABSTRACT

An optical emitter device includes an emitter array comprising a plurality of end-fire tapers, each end-fire taper configured to selectively emit a respective beam of light. A lens system is configured to shape and direct each beam of light based on a position of the respective end-fire taper relative to an optical axis of the lens system. A rotating reflector, including an axis of rotation perpendicular to the optical axis of the lens system, is configured to redirect and scan the beams of light through a scanning range.

16 Claims, 18 Drawing Sheets

(56)     References Cited

U.S. PATENT DOCUMENTS

| | | | |
|---|---|---|---|
| 2017/0219696 A1 | 8/2017 | Hayakawa et al. | |
| 2017/0299697 A1* | 10/2017 | Swanson | G02B 6/29302 |
| 2018/0039027 A1 | 2/2018 | Kato et al. | |
| 2018/0188355 A1* | 7/2018 | Bao | G01S 17/88 |
| 2018/0267250 A1* | 9/2018 | Hosseini | G01S 7/4816 |
| 2019/0346568 A1 | 11/2019 | Feng et al. | |
| 2019/0369213 A1 | 12/2019 | Jenkins | |
| 2020/0081129 A1 | 3/2020 | de Mersseman et al. | |
| 2020/0103502 A1* | 4/2020 | Talty | G02F 1/3136 |
| 2020/0166647 A1* | 5/2020 | Crouch | B60W 10/20 |
| 2021/0096253 A1* | 4/2021 | Sandborn | G01S 17/34 |
| 2021/0278506 A1 | 9/2021 | Pacala et al. | |
| 2022/0003842 A1 | 1/2022 | Wang et al. | |
| 2022/0065999 A1 | 3/2022 | Phare et al. | |
| 2022/0236384 A1 | 7/2022 | Sutton et al. | |
| 2022/0244360 A1 | 8/2022 | Phare et al. | |

OTHER PUBLICATIONS

International Preliminary Report on Patentability issued on PCT International Patent Application No. PCT/US2021/045849 on Dec. 16, 2022.

International Search Report for corresponding PCT Application No. PCT/US2023/062242 filed Feb. 9, 2023.

Parchin et al., "UWB MM-Wave Antenna Array with Quasi Omni-directional Beams for 5G Handheld Devices" 2016 IEEE International Conference on Ubiquitous Wireless Broadband (ICUWB), Nanjing, China, 2016, pp. 1-4, doi: 10/1109/ICUWB.2016. 77904083.

Office Action issued Aug. 3, 2023 for corresponding U.S. Appl. No. 17/002,901.

\* cited by examiner

HYBRID TWO-DIMENSIONAL STEERING LIDAR

TECHNICAL FIELD

The present disclosure relates to an optical emitter device, and in particular to an optical emitter device used in a light detection and ranging (LIDAR) system.

BACKGROUND

On-chip photonics may easily integrate components such as lasers, detectors, and switches with compactness and low cost; however, to achieve beamforming and two-dimensional beam-steering, on-chip photonics consume a great deal of power and can be architecturally complex. On the other hand, using free space optics, e.g. lenses and mirrors, may be architecturally simple and power efficient for beamforming, and beam-steering, but other discrete components, such as lasers, receivers, and switches, are bulky and more expensive than their on-chip counterparts. With demanding applications that require very high resolution, or points per second, the aforementioned problems lead to either bulky and costly LIDAR systems made entirely of free space elements, i.e. multiple lasers, detectors, and switches, or power hungry, limited field-of-view, and low signal-to-noise ratio (SNR) lidar systems made with pure integrated photonics, e.g. an optical-phased-array. The present disclosure describes a low cost and compact hybrid lidar system architecture, in which the best of the two worlds are combined, where the photonics chip integrates the laser, detector, and switches, and the free space optics, e.g. mirror and lenses, are used for the beam-steering and beamforming.

Slow response times of thermo-optic switches used in on-chip photonics are a significant limiting factor in achieving ultrafast optical beam steering. On-chip optical phased arrays (OPA) also suffer from high insertion loss that results in high power consumption, low frame rate, and low signal-to-noise ratio.

One dimensional OPAs also require wavelength tuning to steer the beam in two dimensions. The wavelength tuning range is typically in the tens or hundreds of nanometers to get a field-of-view (FOV) more than 30°. However, wide bandwidth tunable lasers with narrow linewidth (for FMCW lidar) are difficult to design and fabricate.

SUMMARY

Accordingly, a first apparatus includes an optical emitter device comprising:
a first emitter array comprising a plurality of first point emitters, each respective first point emitter configured to emit a respective first beam of output light, and configured to receive a respective first beam of input light;
a first lens system configured to shape and direct each respective first beam of output light and each respective first beam of input light based on a position of each respective first point emitter relative to a first optical axis of the first lens system; and
a rotating reflector configured to redirect each respective first beam of output light outwardly at an angle to the first optical axis, and configured to redirect each respective first beam of input light towards the first emitter array.

BRIEF DESCRIPTION OF THE DRAWINGS

Some example embodiments will be described in greater detail with reference to the accompanying drawings, wherein.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
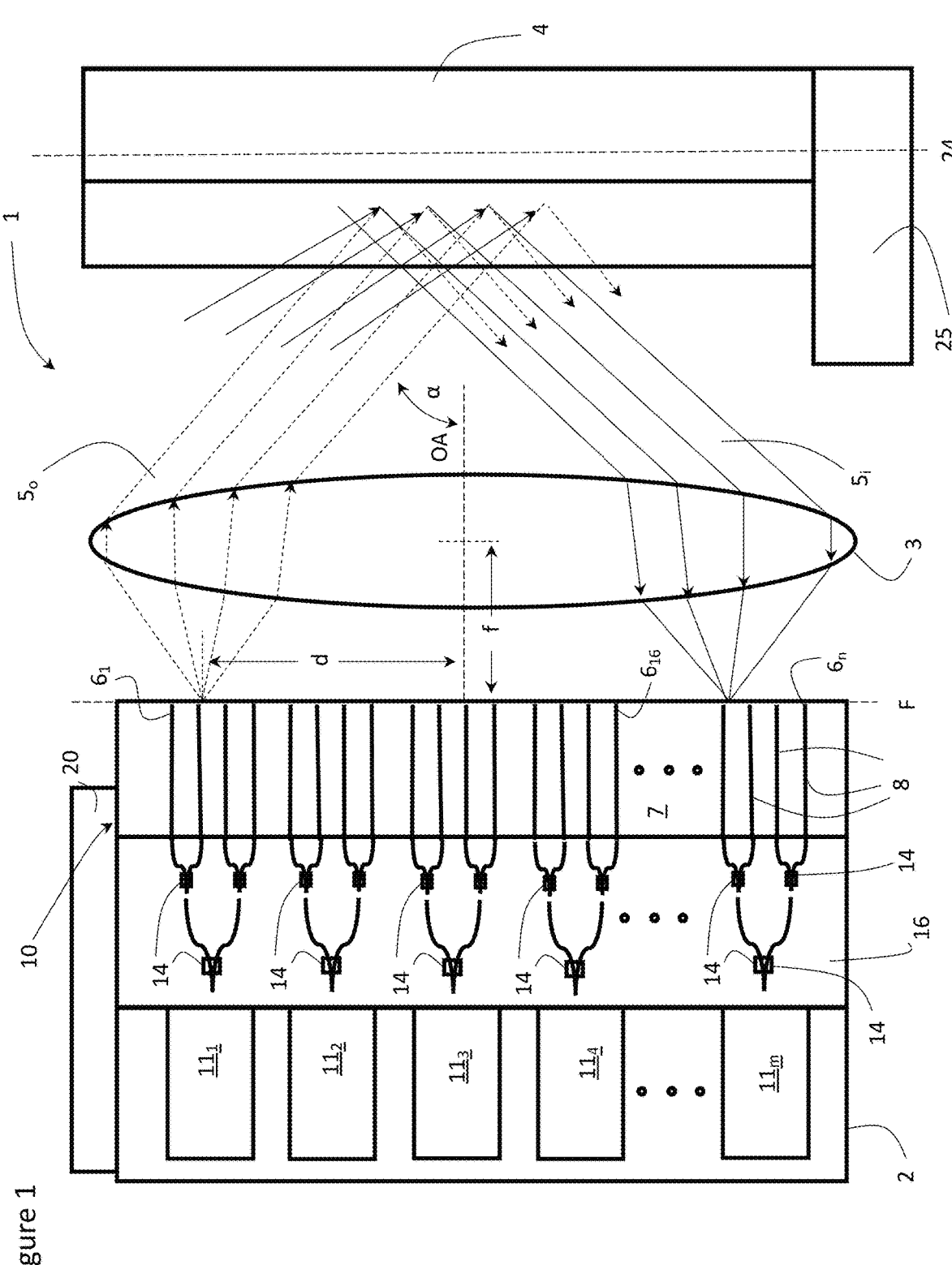
FIG. 1 is an top view in accordance with an example embodiment of the present disclosure.
Figures 2A, 2B:
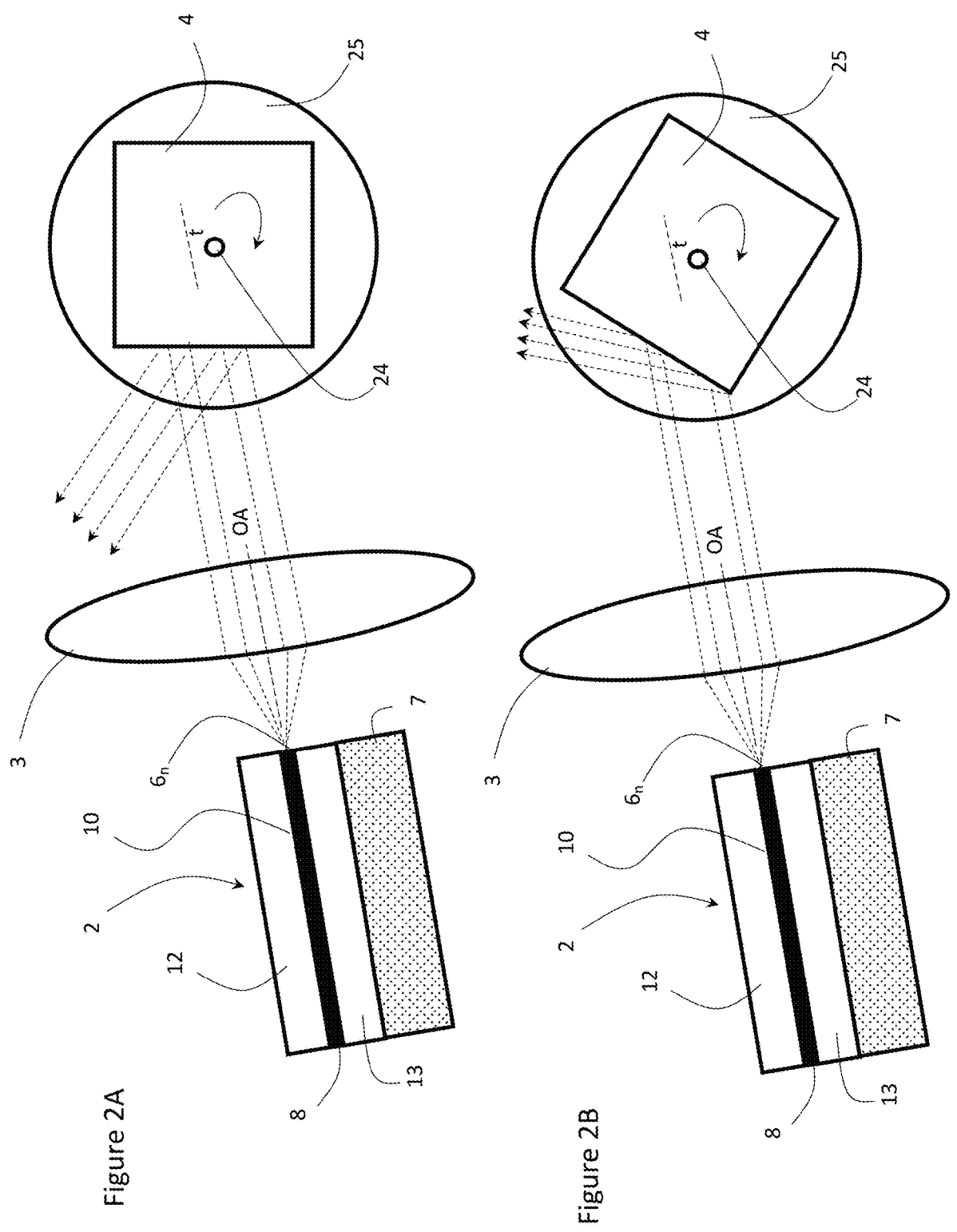
FIG. 2A is a side view of the device of FIG. 1 with the rotating mirror in a first position.
FIG. 2B is a side view of the device of FIG. 1 with the rotating mirror in a second position.

With reference to FIGS. 1, 2A and 2B, an apparatus includes an optical device 1, e.g. LIDAR, which in accordance with an exemplary embodiment comprises: on optical emitter chip 2, a lens system 3, and a rotating reflector, e.g. mirror, 4. For beamforming, one or more highly collimated output beams $5_o$ may be transmitted when a point emitter $6_1$ to $6_n$ from the optical emitter chip 2 is placed proximate to or substantially on the focal plane F of the lens system 3 (infinite conjugation). The reverse propagation is also true based on the reciprocity theorem, whereby a parallel input beam $5_i$, e.g. one of the output beams $5_o$ reflected off of an object, shining on the lens system 3 will focus at a point spot to be captured by one of the point emitters $6_1$ to $6_n$, with a slight spread determined by lens aberration and diffraction. For beam-steering, the far-field beam angle α of the shaped, e.g. substantially collimated or focused, output beam $5_o$ depends on the location of the point emitter $6_1$ to $6_n$ on the focal plane F relative to the longitudinal central optical axis OA of the lens system 3. The beam angle $\alpha$ is governed by the equation: $\alpha=\arctan(d/f)$, where d is the distance from the center of the focal plane, i.e. the point where the optical axis OA coincides with the focal plane F, and f is the focal length of the lens system 3. Therefore, a full LIDAR system may be implemented by placing the optical emitter chip 2 of point emitters $6_1$ to $6_n$ on or near the focal plane F of the lens system 3, then using a controller processor 20, selectively switch on and off selected and unselected point emitters $6_1$ to $6_n$, respectively, to steer the one or more output beams 5 in the desired directions at the desired beam angles $\alpha$. This method is fundamentally different than optical phased arrays as the relative optical phase between the emitters does not need to be controlled, and only one point emitter $6_1$ to $6_n$ may be turned on at a time. Moreover, a plurality of point emitters $6_1$ to $6_n$ may be activated simultaneously or sequentially by the controller processor 20 for transmitting multiple output beams $5_o$ pointing in different directions, i.e. at different beam angles at to an.

The optical emitter chip 2 may include: a main substrate 7 for supporting an optical waveguide structure, including an optical emitter array 10 comprising a plurality of optical waveguide cores 8 surrounded by cladding, each optical waveguide core 8 comprising a main optical waveguide core coupled to and ending with one of the point emitters $6_1$ to $6_n$. Ideally, the point emitters $6_1$ to $6_n$ are arranged into an array of point emitters $6_1$ to $6_n$ comprising a column (or row) of aligned point emitters $6_1$ to $6_n$. Preferably, the point emitters $6_1$ to $6_n$ comprise end-fire tapers 9. The optical emitter chip 2 may include the optical waveguide structure, comprised of one or more optical waveguide layers configured to form the optical waveguide cores 8 with the end-fire tapers 9 coupled at outer ends thereof, all surrounded by cladding, i.e. a material with a lower index of refraction. As seen in FIGS. 2A and 2B, the optical emitter array 10 including the point emitters $6_1$ to $6_n$, the optical waveguide cores 8 and the end-fire tapers 9 may be coplanar with the optical axis OA of the lens system 3. The optical waveguide cores 8 and the end-fire tapers 9 may comprise silicon (Si) or silicon nitride (SiN), or both Si and SiN or any other suitable optical waveguide core material. The optical waveguide structure may be mounted on, e.g. grown on top of, the main substrate 7 with upper and lower cladding 12 and 13 surrounding the optical waveguide cores 8 and the end-fire tapers 9. The upper and lower cladding 12 and 13 may be comprised of on oxide material, such as silicon dioxide ($SiO_2$), e.g. 2-5 $\mu$m thick, and the main substrate 7 may be comprised of silicon, quartz or any suitable material. At least some of the end-fire tapers 9 may be between 25 $\mu$m and 400 $\mu$m in length and taper down, e.g. by 25% to 75%, preferably by about 50%, from the original width of the optical waveguide core 8, e.g. between 400 nm and 500 nm wide by between 200 nm and 250 nm thick, to a tip with a width of between 100 nm and 400 nm and the original thickness, e.g. between 200 nm and 250 nm, although the thickness may also be tapered to less than the optical waveguide core 8, if required. Preferably, the end of the end-fire tapers 9 may be symmetrical, e.g. square (200 nm×200 nm), to ensure that the TE and TM modes are substantially the same size at the end-fire tapers. At least some of the end-fire tapers 9, e.g. point emitter $6_5$, may comprise reverse tapers, which expand, at least in width, from the original dimensions, e.g. width, of the optical waveguide core 8 to a wider width, e.g. 2× to 10× wider or to between 1 $\mu$m and 4 $\mu$m in width. The thickness may also expand, if required. Some of the end fire tapers 9 may be narrowing in width and some of the end fire tapers 9 may be widening in width. Some of the end fire tapers 9 may narrow more or less than other end fire tapers 9, and some of the end fire tapers 9 may widen more or less than the other end fire tapers 9.

Figure 3A:
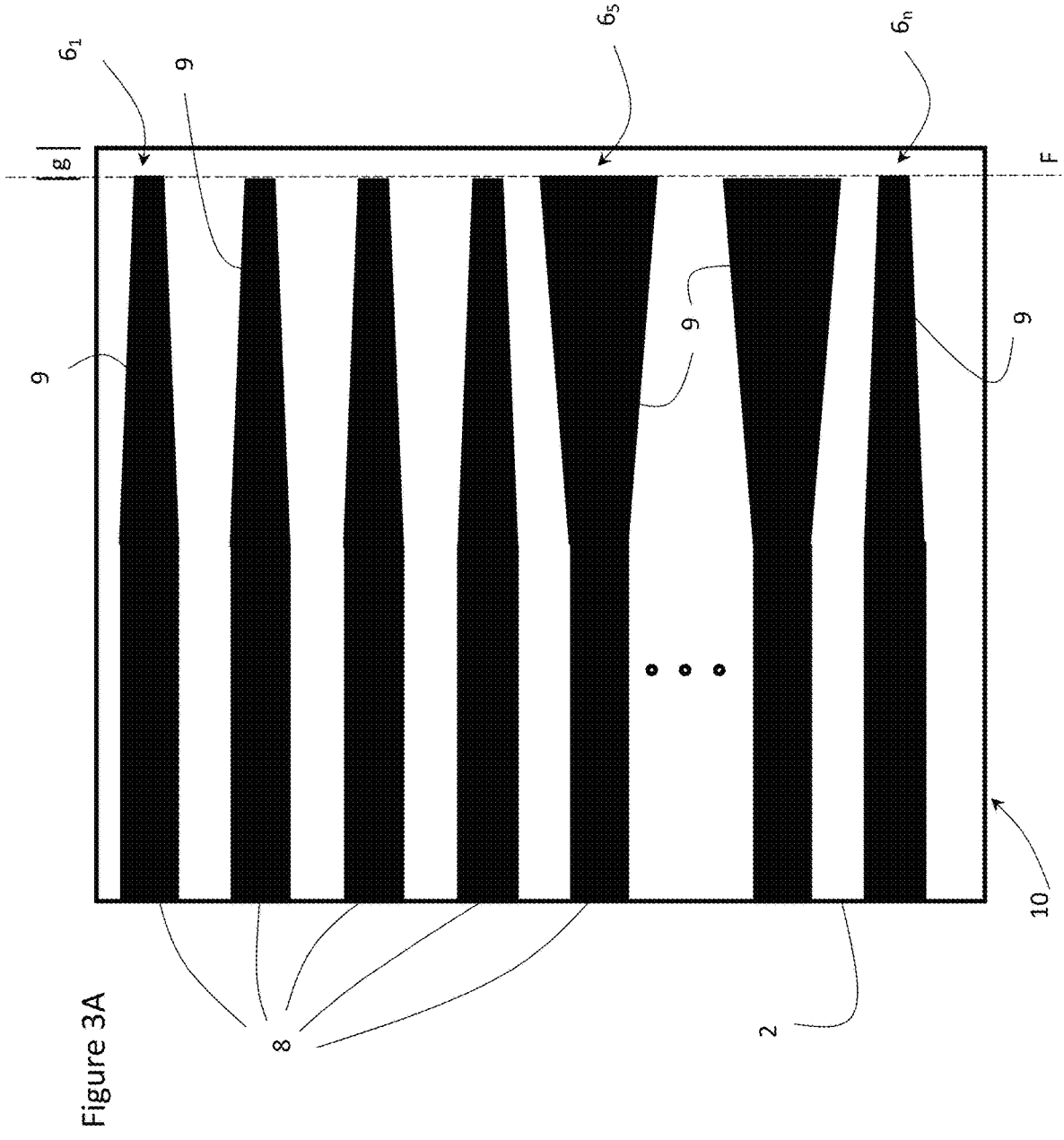
FIG. 3A is a top view of a portion of the optical emitter chip the device of FIG. 1.
Figure 3B:
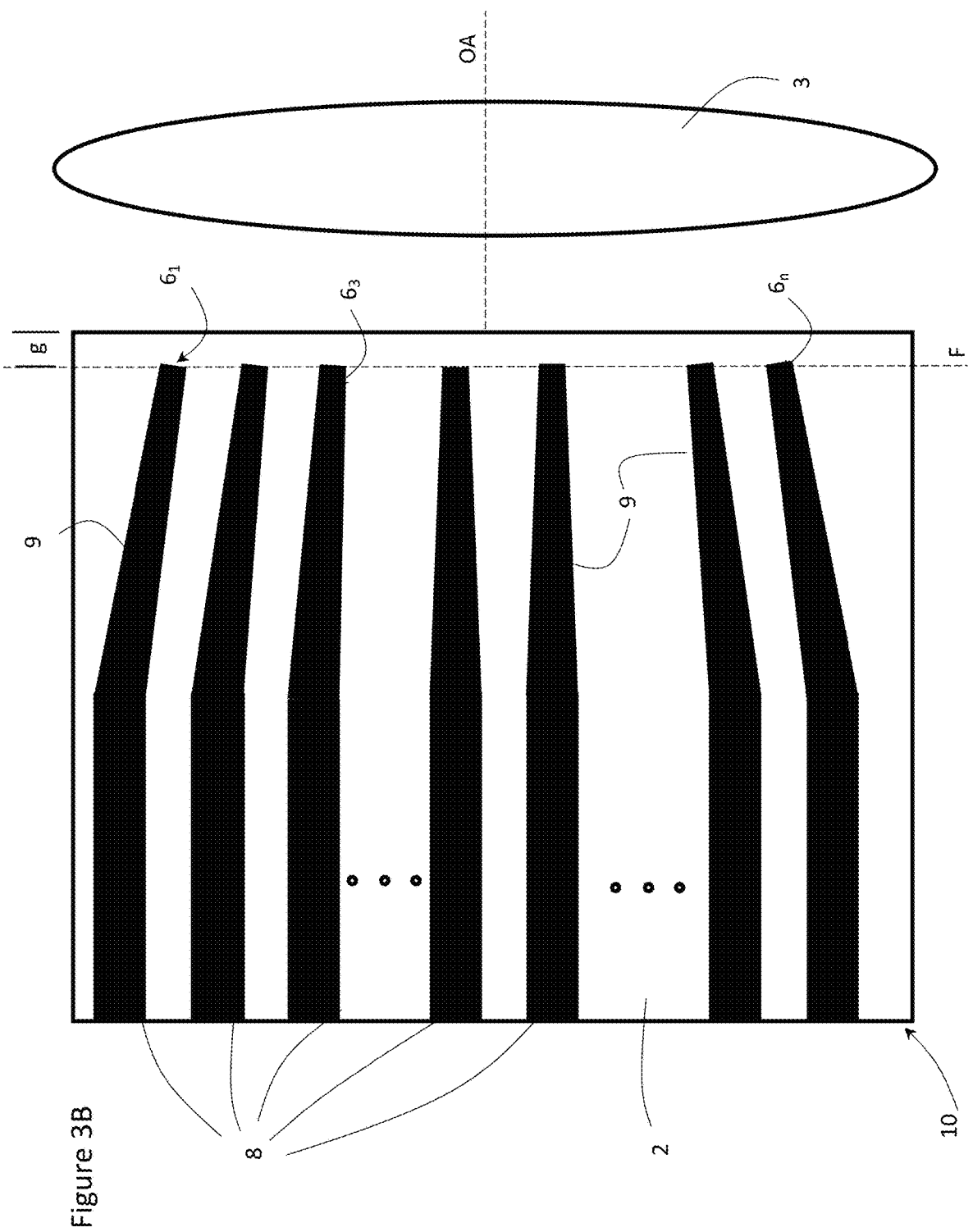
FIG. 3B is a top view of a portion of another exemplary embodiment of the optical emitter chip the device of FIG. 1.

With reference to FIGS. 3A to 3D, there may be a small gap g comprising the same material as the cladding between the edge of the optical emitter chip 2 and the end of each end-fire taper 9. The gap g may be 0 nm up to 5 $\mu$m, preferably 500 nm to 1 $\mu$m. The gap g may be the same or different for some or all of the end-fire tapers 9. With reference to FIG. 3B, some of the end-fire tapers 9 may be configured to extend and terminate at an acute angle to the waveguide core 8 and/or a longitudinal central axis of the optical emitter chip 2, and/or the optical axis OA of the lens system 3. In other words, a longitudinal axis of the end-fire taper 9 is disposed at an acute angle relative to a longitudinal axis of the waveguide core 8 and/or the optical axis OA of the lens system 3. In this way, the chief ray of the light emitted from the end-fire taper 9 towards the lens system 3, or focused from the lens system 3 to the end-fire taper 9, may be tilted from the optical axis OA, i.e. the lens system 3 does not need to be image-space telecentric. Such a property may greatly simplify the design of the lens system 3.

Ideally, some or all of the end-fire tapers 9 are disposed at an acute angle such that the light emitted from the end-fire tapers 9 into free space is parallel to the designed chief ray angle of the lens system 3 at the location in the image plane corresponding to the end-fire taper 9. Some of the end-fire tapers 9 may be configured to extend substantially towards the optical axis OA and/or the longitudinal central axis of the optical emitter chip 2, i.e. the optical emitter array 10. Some of the end-fire tapers 9 may extend at a greater acute angle than other end-fire tapers 9. Preferably, the farther from the optical axis OA of the lens system 3 the greater the acute angle. Accordingly, the gap g may be varying in length along the array of end-fire tapers 9. The ends of each end-fire taper 9 may extend to the same distance from the edge of the optical emitter chip 2, i.e. the same gap length g, whereby each point emitter $6_1$ to $6_n$ is substantially along or proximate to a straight focal plane F. Accordingly, some of the end-fire tapers 9 may have a different length than other end-fire tapers 9, and in particular, the end-fire tapers 9 at the outer edges of the optical emitter chip 2 are longer than the end-fire tapers 9 in the middle of the optical emitter chip 2, and/or the end fire tapers 9 gradually increase in length starting with shorter end-fire tapers 9 in the middle of the optical emitter chip 2, e.g. along the longitudinal central axis of the optical emitter chip 2 and/or the optical axis OA of the lens system 3, and ending at the outer end-fire tapers 9 with longer end-fire tapers 9. Alternatively, the end-fire tapers 9 may be made all the same length, but the main optical waveguide cores 8 extended differing lengths to accommodate the differing gaps g between the end-fire tapers 9 and the edge of the optical emitter chip 2. The optical waveguide cores 8 and the end-fire tapers 9 may also be joined by a gradual bend rather than a sharp transition. In some embodiments the differing gap length g may be accommodated by differing radii or lengths of these gradual bends. The ends of the end-fire tapers 9 may be perpendicular to the edge of the optical emitter chip 2 and/or perpendicular to the longitudinal central axis of the end-fire taper 9.

Figure 3C:
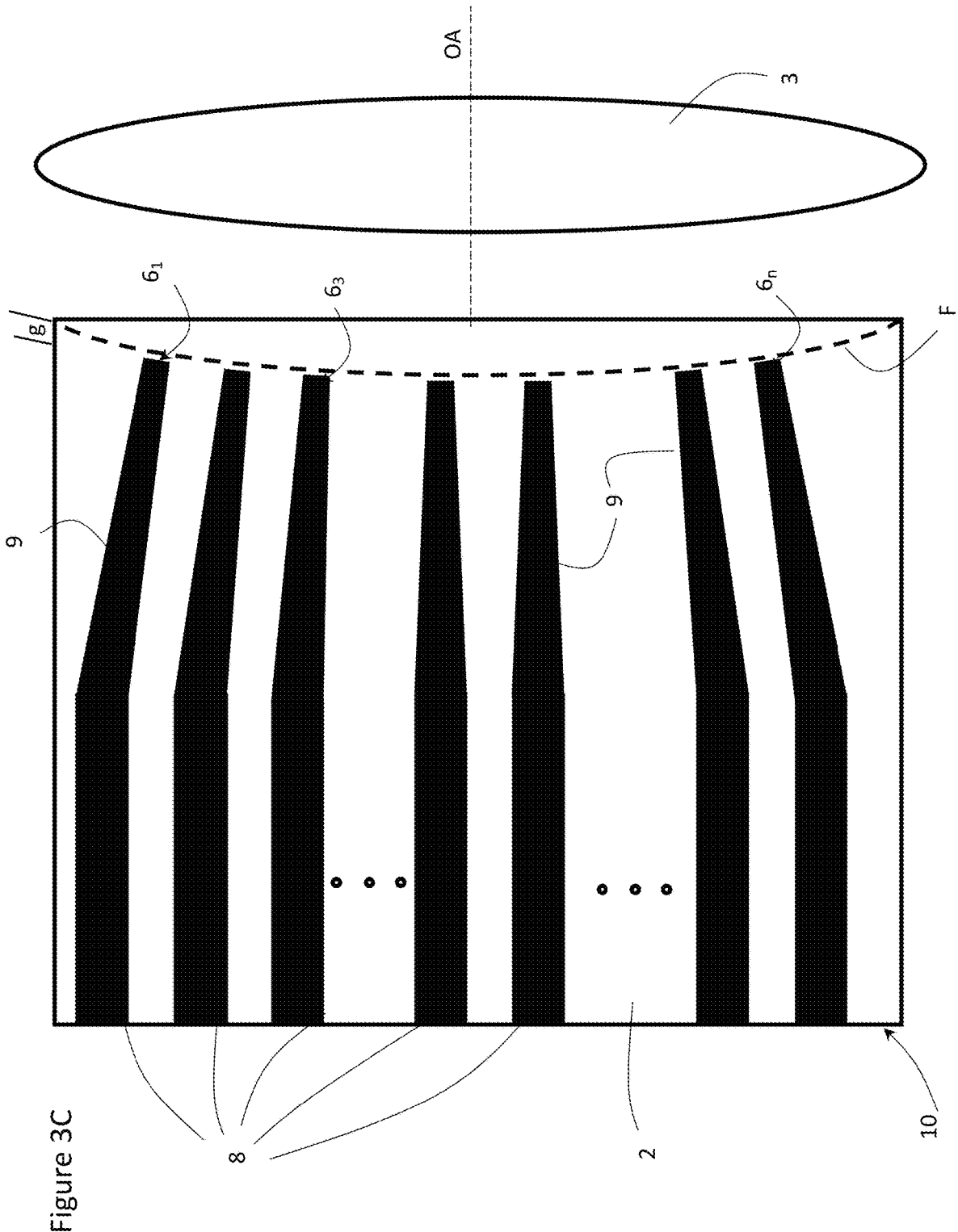
FIG. 3C is a top view of a portion of another exemplary embodiment of the optical emitter chip the device of FIG. 1.
Figure 3D:
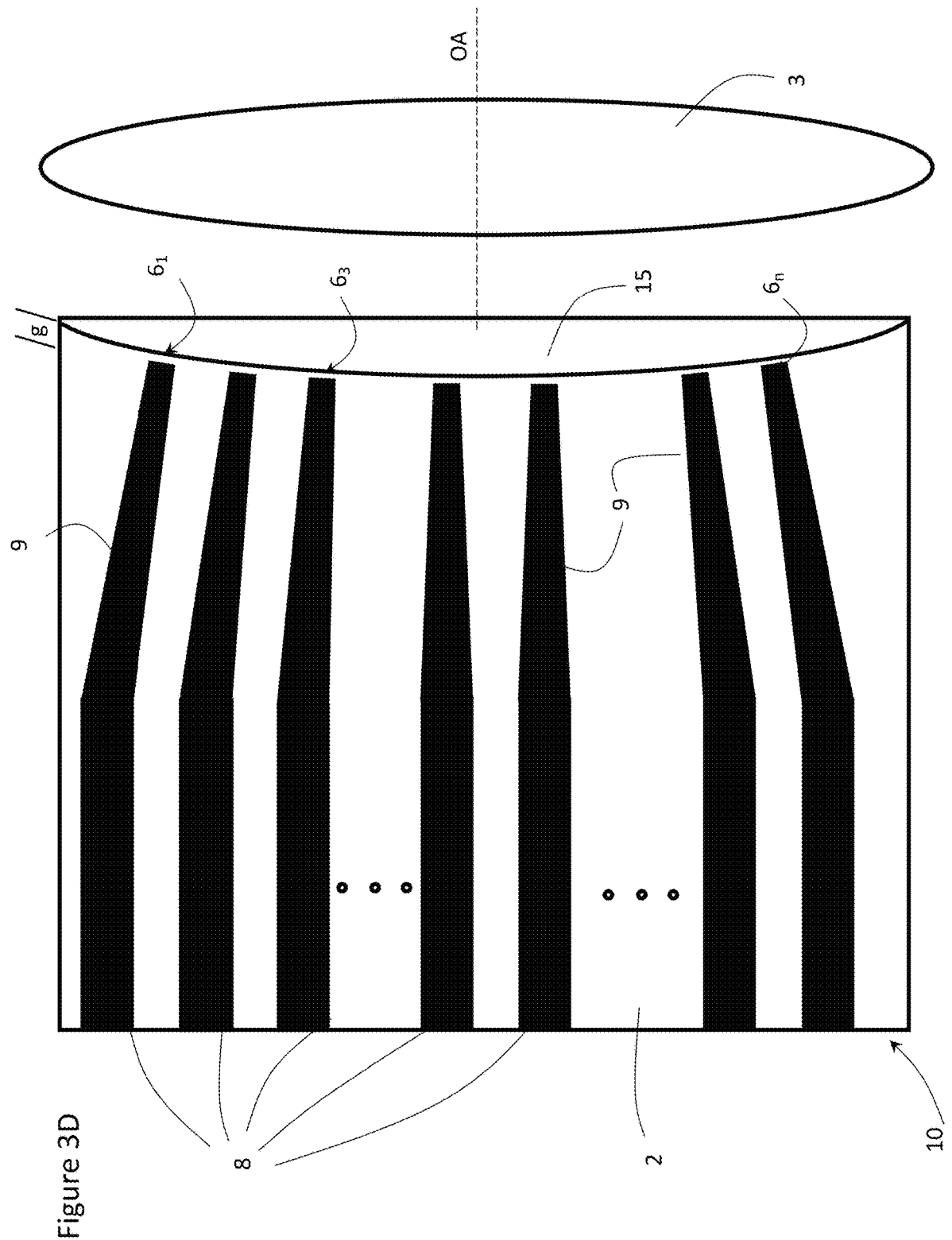
FIG. 3D is a top view of a portion of another exemplary embodiment of the optical emitter chip the device of FIG. 1.

With reference to FIGS. 3C and 3D, some or all of the end-fire tapers 9 may be disposed such that each point emitter $6_1$ through $6_n$ is substantially along or proximate to a curved focal plane F, corresponding to the curved focal plane F of the lens system 3. This curved focal plane F may be approximately spherical, corresponding to a non-zero Petzval sum of the lens system 3, or may be aspheric. The lens system 3 and shape of the focal plane F optimally may be co-designed such that the curvature of the focal plane F can help to reduce optical aberrations in the lens system 3 or simplify its design, e.g. allow the lens system 3 to comprise fewer elements.

With reference to FIG. 3D, the edge of the optical emitter chip 2 may be further etched down to form a trench 15, a substantially curved edge of which may be substantially along or parallel to the curved focal plane F, with the end-fire tapers 9 ending proximate to the edge of the curved trench 15, e.g. with the gap g therebetween. The ends of each end-fire taper 9 may extend to a same distance from the edge of the optical emitter chip 2, i.e. the same gap length g, whereby each point emitter $6_1$ to $6_n$ is substantially along or proximate to the curved focal plane F. The trench 15 may also be fully etched away through the upper cladding 12 and the lower cladding 13, and optionally the substrate 7, if necessary, to avoid the light coming out of the end-fire tapers 9 hitting the bottom surface of the trench 15, e.g. when the curve of the trench 15 has a large sagitta. Alternatively, the trench 15 may be partially etched and the substrate 7 thinned from the back until no material remains in the area defined by the trench 15. For sufficiently small sagitta, a partial etch of the trench 15 alone may be sufficient. The ends of the end-fire tapers 9 may be directed, i.e. the longitudinal central axis thereof may be, substantially perpendicular or at an acute angle to the tangent of the edge of the trench 15. The edge of the trench 15 may be curved, e.g. colinear or parallel to the curved focal plane F, or include a series of steps, e.g. one step for each point emitter $6_1$ to $6_n$. Accordingly, the gap g of the cladding material, i.e. between the end of the end-fire taper 9 and the curved trench 15, may again have substantially the same length of cladding material for each end-fire taper 9.

With reference to FIGS. 3A through 3D, which illustrates a section of the optical emitter array 10 on the optical emitter chip 2, the positions of the point emitters $6_1$ through $6_n$ may be spaced regularly, i.e. a same distance apart, or irregularly, i.e. different distances apart, along the direction perpendicular to the optical axis OA or the edge of the optical emitter chip 2. The position of the point emitters $6_1$ to $6_n$ with respect to the optical axis OA, combined with the design, i.e. focal length, of the lens system 3, sets the beam angle $\alpha$ of the output beam $5_o$ leaving the lens system 3 and travelling into free space. In some embodiments, the point emitters $6_1$ to $6_n$, i.e. the end-fire tapers 9, may be deliberately spaced irregularly to address a non-uniform family of angles with the output beams $5_o$. In some embodiments, the lens system 3 may have distortions such that a regular spacing of point emitters $6_1$ to $6_n$ may create an irregular angular spacing of the output beams $5_o$. To compensate for such distortions, the spacing of the point emitters $6_1$ to $6_n$ i.e. the end-fire tapers 9, may be varied and made irregular in the opposite direction so that the angular spacing is substantially uniform leaving the lens system 3.

One or more of the modifications to the end-fire tapers 9 and facet design described above may be combined in a single embodiment. Particularly, a layout of the point emitters $6_1$ to $6_n$ that allows for focal plane curvature, arbitrary chief ray angle, and corrected distortion significantly relieves constraints on the design of the lens system 3, and may allow it to be constructed of a single element, even at low f-number.

Figure 4:
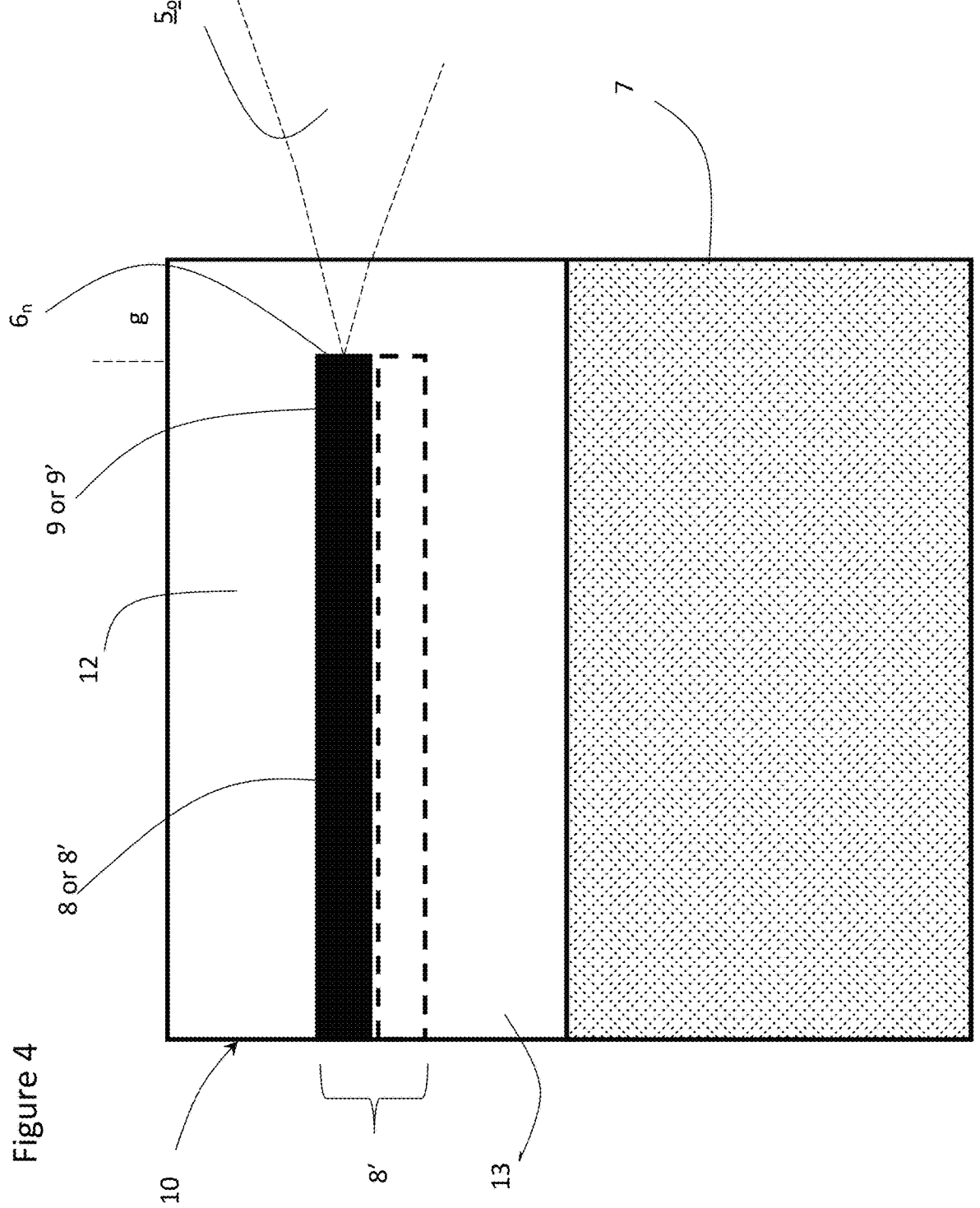
FIG. 4 is a cross sectional view of an exemplary optical emitter chip of the device of FIG. 1.

FIG. 4 illustrates a cross section of the optical emitter chip 2, i.e. showing one of the point emitters $6_n$ in the optical emitter array 10. The array of point emitters $6_1$ to $6_n$ may include some or all of the optical waveguide cores 8 comprised of one or two optical waveguide layers configured to form singular or bi-layer optical waveguide cores 8 or 8', respectively, and singular or bi-layer end-fire tapers 9 or 9', respectively. Including a second layer of optical waveguide core material enables mode profile engineering that may also enable modification of the NA of the point emitters $6_1$-$6_n$, i.e. launching light into a coupled mode that has a broader mode spread results in a smaller NA. The bi-layer optical waveguide cores 8' and the bi-layer end-fire tapers 9' may be comprised of two similar optical waveguide core materials with similar indexes of refraction, e.g. both silicon (Si) or both silicon nitride (SiN), or of two different optical waveguide core materials with different indexes of refraction, such as a first index of refraction, e.g. Si, larger than a second index of refraction, e.g. SiN, or any other suitable optical waveguide core material. The optical waveguide cores 8 or 8' may be mounted on, e.g. grown on top of, the main substrate 7 with upper and lower cladding 12 and 13 surrounding and between the dual optical waveguide cores 8' and end-fire tapers 9'. The upper and lower cladding 12 and 13 may be comprised of on oxide material, such as silicon dioxide ($SiO_2$), e.g. about 2-4 μm thick, preferably about 3 μm thick, and the main substrate 7 may be comprised of silicon or any suitable material.

Figure 5:
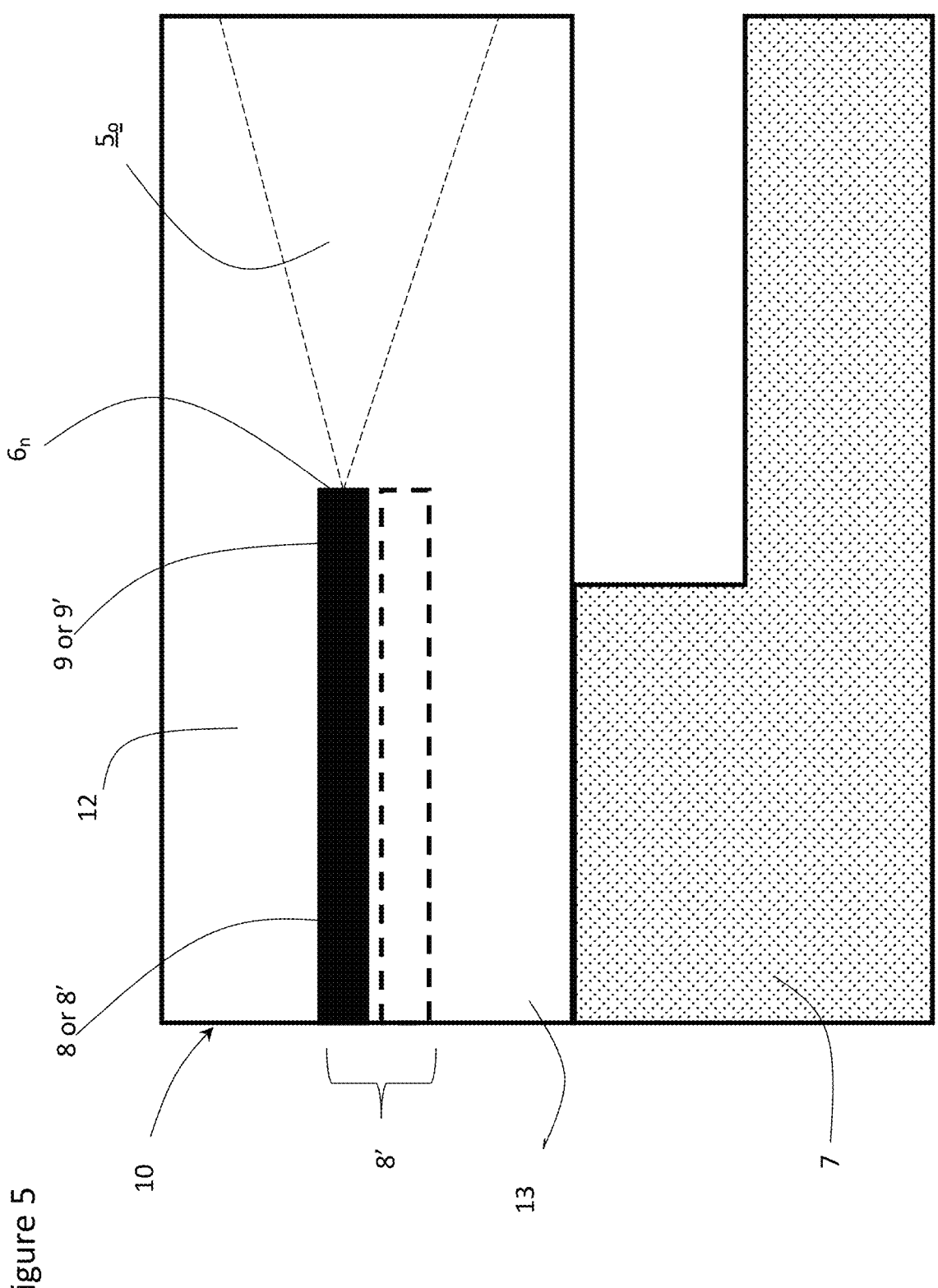
FIG. 5 is a cross sectional view of another exemplary optical emitter chip of the device of FIG. 1.
Figure 6:
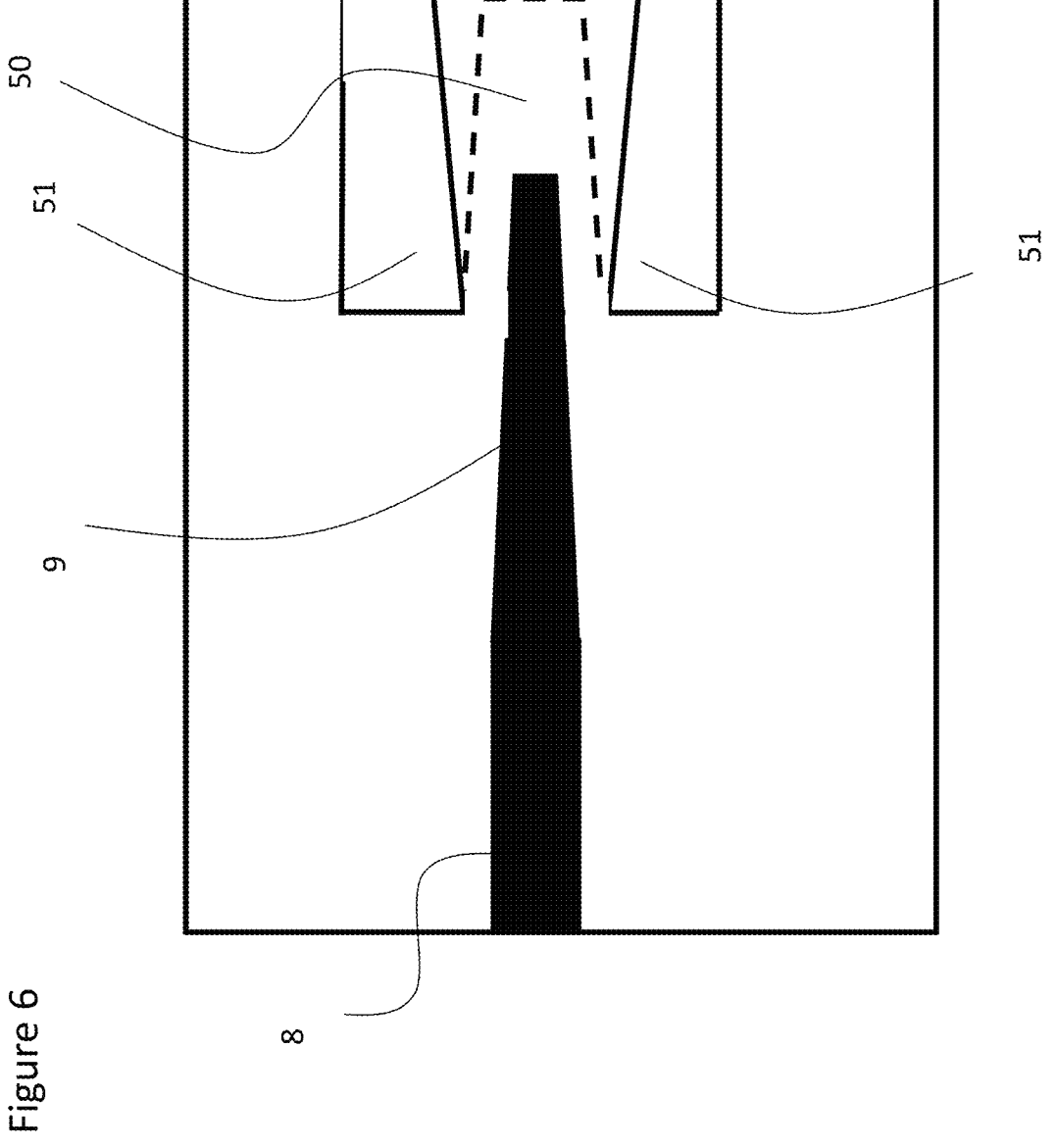
FIG. 6 is a top view of the optical emitter chip of the device of FIG. 5.

With reference to FIGS. 5 and 6, to further reduce the NA of the point emitters $6_1$ to $6_n$, a suspended optical waveguide structure 50 may be provided optically coupled to the end of some or each of the end-fire tapers 9 or 9'. The suspended optical waveguide structure 50 may be comprised of the cladding material, e.g. $SiO_2$, now forming the optical waveguide core, surrounded by a pocket of material with a lower index of refraction, e.g. air, forming cladding. The suspended optical waveguide structure 50 may be suspended above the main substrate 7 by removing, e.g. etching, one or more of the substrate material from the main substrate 7 and/or the cladding material from the upper and lower cladding 12 and 13 beneath and/or around the suspended optical waveguide structure 50 forming a pocket or chamber 51 around the suspended optical waveguide structure 50. Accordingly, the NA for suspended waveguide structure 50/end-fire tapers 9 or 9' may be reduced to less than about 0.25, preferably less than about 0.2. The suspended optical waveguide structure 50 may extend about 2 μm to 50 μm into the chamber 51, whereas the end fire taper 9 or 9' may extend somewhat into the chamber 51, but less than the full length of the suspended optical waveguide structure 50. The suspended optical waveguide structure 50 may have a thickness, e.g. about 6 μm to 8 μm, the same as the total optical emitter array 10, or may be made thinner than the optical emitter array 10 by the local removal of some of the upper cladding 12. The suspended optical waveguide structure 50 may have a constant width about the same as the thickness, e.g. about 6 μm to 8 μm. The suspended optical waveguide structure 50 may include tapering side and/or upper and/or lower walls, i.e. narrowing width and/or height towards the outer free end thereof (dashed lines) or may include reverse tapering side and/or upper and/or lower walls, i.e. widening width and/or height towards the outer free end thereof, i.e. along a light transmission direction. Ideally, the end-fire taper 9 or 9' is positioned in the center both vertically and horizontally of the waveguide structure 50.

The lens system 3 may comprise a plurality of lens elements, if required. Most of the design of the lens system 3 is a compromise between the F-number, the field-of-view, and the aperture size. However, there may be a few design priorities: e.g. a) to have an image-plane telecentric design, where the chief rays from the point emitters $6_1$ to $6_n$ are all parallel to the optical axis OA in the image space, b) reaching diffraction limit across the field-of-view, and c) the image space numerical aperture (NA) of the lens system 3 substantially matches or exceeds the NA of the point emitters $6_1$ to $6_n$. Minimizing the effect of lens curvature aberrations enables the smallest spread in the output beams $5_o$ and the best possible focusing for the receiving input beams $5_i$. The point emitters $6_1$ to $6_n$ preferably emit output beams $5_o$ at a beam angle that may be fully captured and transmitted by the lens system 3. For example, if the NA of one or more of the point emitters $6_1$ to $6_n$ is larger than the image space NA of the lens system 3, then a portion of the light emitting from the point emitters $6_1$ to $6_n$ will not transmit through the lens system 3, therefore rendered as loss.

The optical device 1 may also include at least one light source, preferably an array of light sources, and at least one photodetector, preferably an array of photodetectors optically coupled to corresponding one or more point emitters $6_1$ to $6_n$ in the optical emitter chip 2. Preferably, the array of light sources and the array of light detectors comprises an array of transceivers $11_1$ to $11_n$. Each transceiver $11_1$ to $11_n$ may comprise a light source, e.g. laser, which generates at least one of the output beams $5_o$, and one or more photodetectors, which detects at least one of the input beams $5_i$. Selectively sending and receiving light to and from the point emitters $6_1$ to $6_n$ may be provided by a switching matrix 16 between the transceivers $11_1$ to $11_n$ and the point emitters $6_1$ to $6_n$. Accordingly, to select a desired point emitter $6_1$ to $6_n$, corresponding to a desired beam angle α, the controller processor 20 may select one or more of the light sources in one of the transceivers $11_1$ to $11_n$, corresponding to one or more of the point emitters $6_1$ to $6_n$, in that row or column by turning on and/or off various switches 14 in the switching matrix 16. For example, with four point emitters $6_1$ to $6_4$ (m=4) in the row or column of point emitters $6_1$ to $6_n$, connected to the first transceiver $11_1$, the switching matrix 16 may have a single input port optically coupling the first transceiver $11_1$ to a first switch tree comprising (m−1=3) switches 14, e.g. 2×2 on-chip Mach-Zehnder interferometers (MZI), which can be selectively activated by the controller processor 20 to output the output beam $5_o$ to a desired output port. Any number of branches and switches 14 in the first switch tree, including direct coupling from each transceiver $11_1$ to each point emitter $6_1$ to $6_n$, is possible. A plurality of optical waveguide cores 8 extend parallel to each other between the output ports of the switching matrix 16 and the point emitters $6_1$ to $6_n$. Ideally, the pitch of the point emitters $6_1$ to $6_n$ in the optical emitter chip 2 is 5 μm to 1000 μm or based on the focal length f, size L of the optical emitter array 10 and the angular resolution required by the LIDAR system:

$$Pitch=resolution/(2*arctan(L/2f))*L$$

Similarly, when one of the incoming beams $5_i$ is received at the same point emitter $6_1$ to $6_n$, the incoming beam $5_i$ is transmitted in reverse via the corresponding optical waveguide core 8 to the switching matrix 16 back to the corresponding photodetector in the corresponding transceiver $11_1$ to $11_n$.

The optical emitter chip 2 may comprise any one or more of the n optical transceivers $11_1$ to $11_n$, the switching matrix 16, and the array of point emitters $6_1$ to $6_n$; however, any one or more of the n optical transceivers $11_1$ to $11_n$, and the switching matrix 16 may be on separate chips. At any instance, the laser output from one of the optical transceivers $11_1$ to $11_n$ is routed to a specific end-fire taper 9 ending at near the edge of the optical emitter chip 2. Each point emitter $6_1$ to $6_n$, i.e. each end-fire taper 9, is configured to emit an output beams $5_o$ out of the edge of the optical emitter chip 2, after which each output beam $5_o$ expands and is directed towards the lens system 3. The edge of the optical emitter chip 2 is aligned on or near the focal plane F of the lens system 3, therefore the output beams $5_o$, expanding from the end-fire taper 9, will be shaped, e.g. collimated, by the lens system 3 and then emitted to the far field. The far field angle of the output beams $5_o$ depends on the location of the point emitter $6_1$ to $6_n$ relative to the optical axis OA of the lens system 3, therefore providing a one dimensional scanning of beams by selectively turning on each point emitters or multiple point emitters at the same time, e.g. depending on how many optical transceiver $11_1$ to $11_n$.

The second axis of the scan is provided by the rotating mirror 4. The output beam $5_o$ coming out of the lens system 3 hits one of the reflective surfaces or facets of the rotating mirror 4 and is redirected into the far field for object detection. The input beam $5_i$ corresponding to the output beam $5_o$ reflected from the object, may return via the same reflective surface and the lens system 3 to the originating point emitter $6_1$ to $6_n$, for capture by the corresponding photodetector, prior to the rotating mirror 4 rotating out of range, i.e. rotating enough to not be able to direct the corresponding input beam $5_i$ substantially back to the same originating point emitter $6_1$ to $6_n$ as the output beam $5_o$ in a round trip period, e.g. 0.5 ns to 5 μs for an object 7.5 cm to 750 m away. Typically, an output beam $5_o$ is launched by one of the light sources every 2 μs to 1000 μs. In other words, the optical device 1 chirps at about 1 kHz to 500 kHz, i.e. the output beam $5_o$ (continuous or pulsed) is launched every 2 μs to 1 ms.

For each round trip period, some or all of the point emitters $6_1$ to $6_n$ may emit an output beam $5_o$ forming a plurality of beams of light in a same detection plane, but at different beam angles α covering an angular detection range, e.g. 10° to 90°. Each light source, e.g. each transceiver $11_1$ to $11_m$, may transmit a beam of light which is separated into sub-beams, e.g. 2-8 sub-beams, by the switching matrix 16, i.e. when all switches 14 are off or omitted entirely, and transmitting light to every waveguide core 8, which are then simultaneously transmitted by the point emitters $6_1$ to $6_n$.

To reduce the number of light sources and photodetectors required, while maintaining a maximum or desired threshold optical power, the controller processor 20 may also cycle through a group of the point emitters, e.g. $6_1$ to $6_4$, which are optically coupled to one of the transceivers, e.g. transceiver $11_1$, by turning selected switches 14 on and off to sequentially transmit a different output beam $5_o$ to each of the point emitters, e.g. $6_1$ to $6_4$, in the group. Some or all of the light sources, e.g. some or all of the transceivers $11_1$ to $11_m$, may have a different group of waveguide cores 8 optically coupled thereto, whereby a first subset of output beams $5_o$ may be transmitted simultaneously at a time, i.e. one output beam $5_o$ from each light source transmitted via one of the group of waveguide cores 8 coupled thereto. Then, under control of the controller processor 20, each light source will sequentially cycle through each of the waveguide cores 8 in the corresponding group of waveguide cores 8 coupled thereto, spending at least a single round trip period switched to each emitter, e.g. $6_1$-$6_4$. The round trip period should be at least as long as the time necessary for the light to travel from the light source of the point emitter, e.g. $6_1$ to $6_4$, to the target and back to the photodetector of the point emitter, e.g. $6_1$ to $6_4$. Accordingly, only a portion of the total number of output beams $5_o$ (and the input beams $5_i$) to cover the full range of beam angles α may be transmitted at one time. The controller processor 20 may coordinate the light sources, the switching matrix 16, an angular position of the rotating mirror 4, and the photodetectors to transmit and receive each output beam $5_o$ and each input beam $5_i$ sequentially via the first switching matrix 16 and the plurality of first point emitters $6_i$-$6_n$.

As the rotating mirror 4 rotates, one or more output beams $5_o$ may then be scanned, i.e. rotated, through a predetermined scanning range, e.g. angle, depending on the number of facets and the size of the facets on the rotating mirror 4. There are ranges of angles for which the output beams $5_o$ (and input beams $5_i$) falling on one of the facets of the rotating mirror 4 are not clipped at the edges, and the total optical scanning range is twice that angular range. One can define a duty cycle as the percentage of the full rotation cycle where the output and input beams $5_o$ and $5_i$ are fully incident on a facet of the rotating mirror 4 without clipping. For example, four facets with a size of 30×30 mm square face provides a scanning range of about 1000 with a duty cycle of 60%, and three facets with a size of the same size provides a scanning range of about 120° with a duty cycle of 50%. As the rotating mirror 4 rotates, the angle of each facet relative to the output beams $5_o$ continuously changes through the range of angles between a first minimum angle i.e. directed at a first edge or corner of the rotating mirror 4 redirecting the output beams to one side of the rotating mirror 4 (FIG. 2A), to substantially perpendicular (intermediate angle) after which the output beams $5_o$ are redirected to a far side of the rotating mirror 4, then to a second maximum angle, i.e. directed at a second edge or corner of the rotating mirror 4 (FIG. 2B). After the maximum angle of each facet, the output beams $5_o$ will sequentially hit and be redirected by the subsequent facets, and proceed through the scanning range of angles from the first minimum angle to the intermediate angle to the second maximum angle again for each facet of the rotating mirror 4.

When the output beams $5_o$ are directed at an edge of the rotating mirror 4 between facets, the light may scatter in different directions, accordingly, the controller processor 20 may reduce or eliminate any incorrect readings by one or more error mitigating schemes by coordinating the position of the rotating mirror 4 with the control of the light sources and the photodetectors, such as turning off the light sources and/or the photodetectors in transceivers $11_1$ to $11_n$ for a period of time while the output beams $5_o$ are directed at an edge or by simply disregarding any readings from the photodetectors for the period of time while the output beams $5_o$ are directed at an edge.

The rotating mirror 4 may be comprised of a polygonal prism, comprising a plurality, e.g. 3 or 4 or 5 or 6, of facets, each comprising a reflective surface, and with a longitudinal axis of rotation 24, which may or may not be aligned with a rotational axis of a spinning motor 25. The spinning motor 25 may be any type of rotary motor, such as a stepper motor, dc motor, or servo motor. The longitudinal axis of rotation 24 may not be aligned to the axis of the spinning motor 25 when the axes are connected with a belt or gear system. The longitudinal axis of rotation 24 of the rotating mirror 4 may be perpendicular to the optical axis OA of the lens system 3 and/or parallel to a first plane in which the emitter array 10 lies. The optical axis OA may lie in a second plane perpendicular to the first plane and perpendicular or normal to the axis of rotation 24.

Direct reflection of the output beam $5_o$ directly back into the point emitter $6_1$ to $6_n$, i.e. the end-fire taper 9, may be prevented, and the field of view (FOV) may be increased, by disposing the longitudinal axis of rotation 24 of the rotating mirror 4 offset, distance t, from the optical axis OA of the lens system 3, i.e. the axis of rotation 24 may not intersect with the optical axis OA. Generally, the unobstructed FOV range begins at a position where the output beam $5_o$ misses the lens system 3 (back reflected) and ends when the output beam $5_o$ begins to clip the edges of the mirror facet.

There may be dead zones, in which no accurate transmit/return measurements are possible, created by the corners of the rotating mirror 4, which depend on the size and number of the facets.

Figure 7:
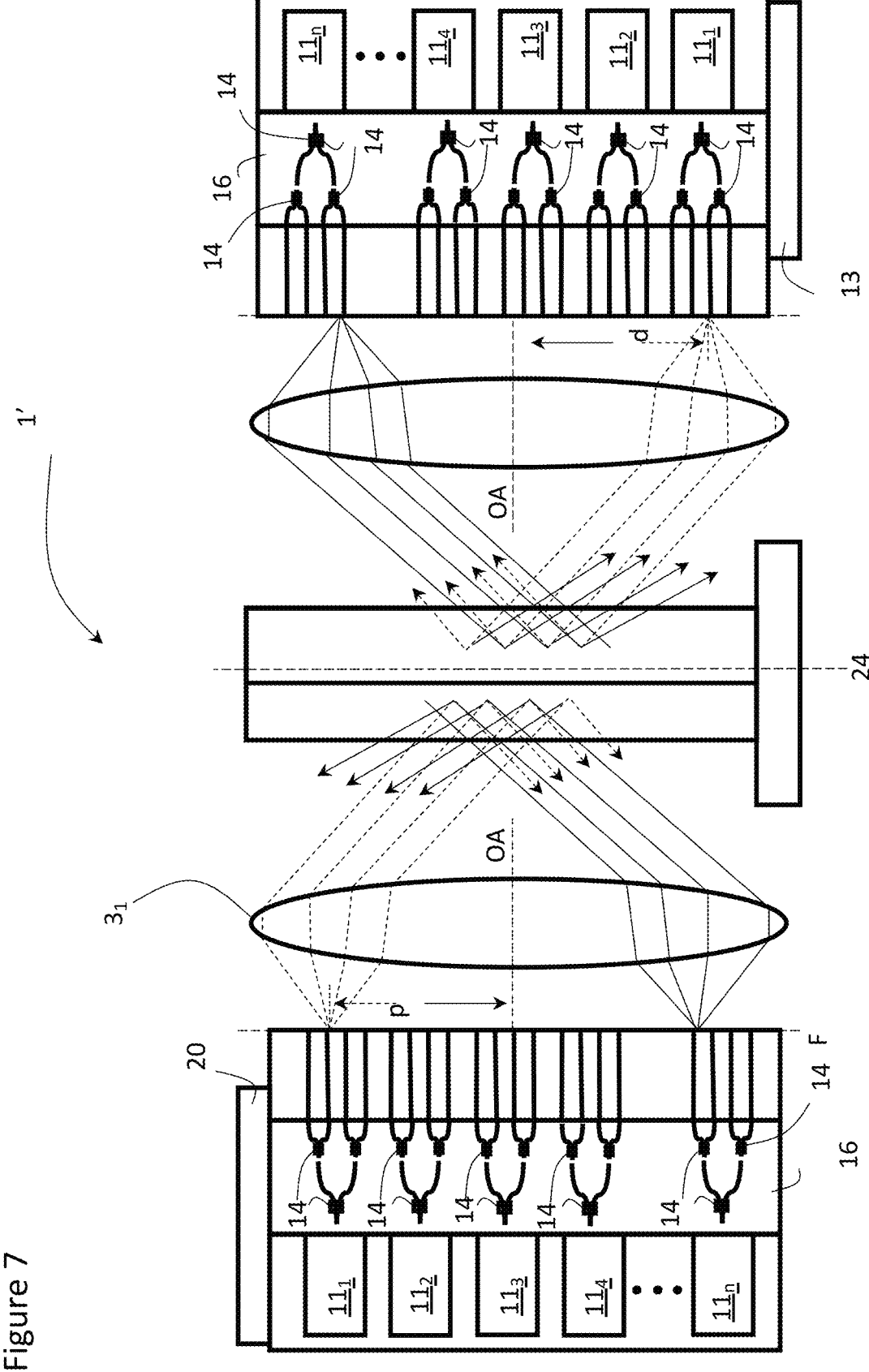
FIG. 7 is a top view in accordance with an example embodiment of the present disclosure.
Figure 8:
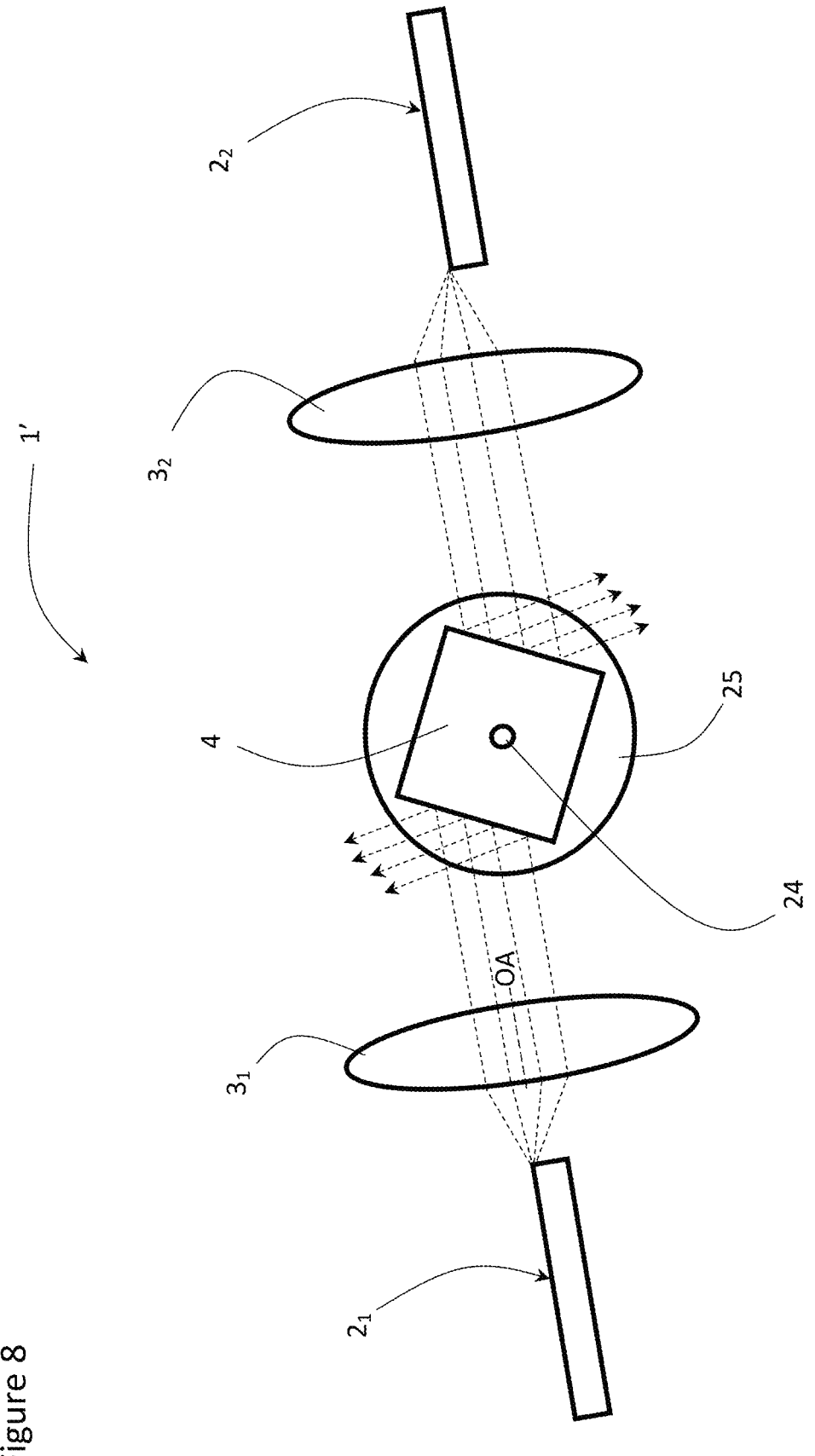
FIG. 8 is a side view of the device of FIG. 4.

The rotational speed (revolutions per second, or rps) of the rotating mirror 4 depends on the switching scheme; however, the rotational speed may be the same speed as or less than the LIDAR frame rate, i.e. how long it takes to scan the entire scanning range. For example, for 3 frames/second, divided by the number of facets, e.g. 3-6 facets, equals e.g. 1~0.5 rps. The rotational speed is preferably kept less than a threshold speed, at which errors may occur if the sweep is too fast such that the input beam $5_i$ does not reflect back to the same point emitter $6_1$-$6_n$ (or even hitting nothing). Ideally, this means that the motor angular velocity (in degrees per second), e.g. between 1 and 50 rps, or 360 and 18000 degrees per second, is less than the input beam $5_i$ divergence (in degrees), e.g. between 0.2° and 0.002°, divided by the round-trip time for the light to travel from the mirror system 3 to the target and back (in seconds). For example, for a beam divergence of 0.02° and a target 500 m away, the round-trip time would be 3.33 μs, so the mirror would ideally turn more slowly than 0.02 degrees/3.33 μs, i.e. 6000 degrees/s or roughly 17 rps./#facets With reference to FIGS. 7 and 8, an exemplary optical emitter device 1' includes a plurality of optical emitter chips $2_1$ to $2_n$ and corresponding lens systems $3_1$ to $3_n$ sharing a single polygonal rotating mirror 4. The benefit of this approach is to expand the field-of-view in one system. A smaller number of facets, e.g. 3 to 6, is desired to keep the volume size of the rotating mirror 4 relatively small.

Figure 9:
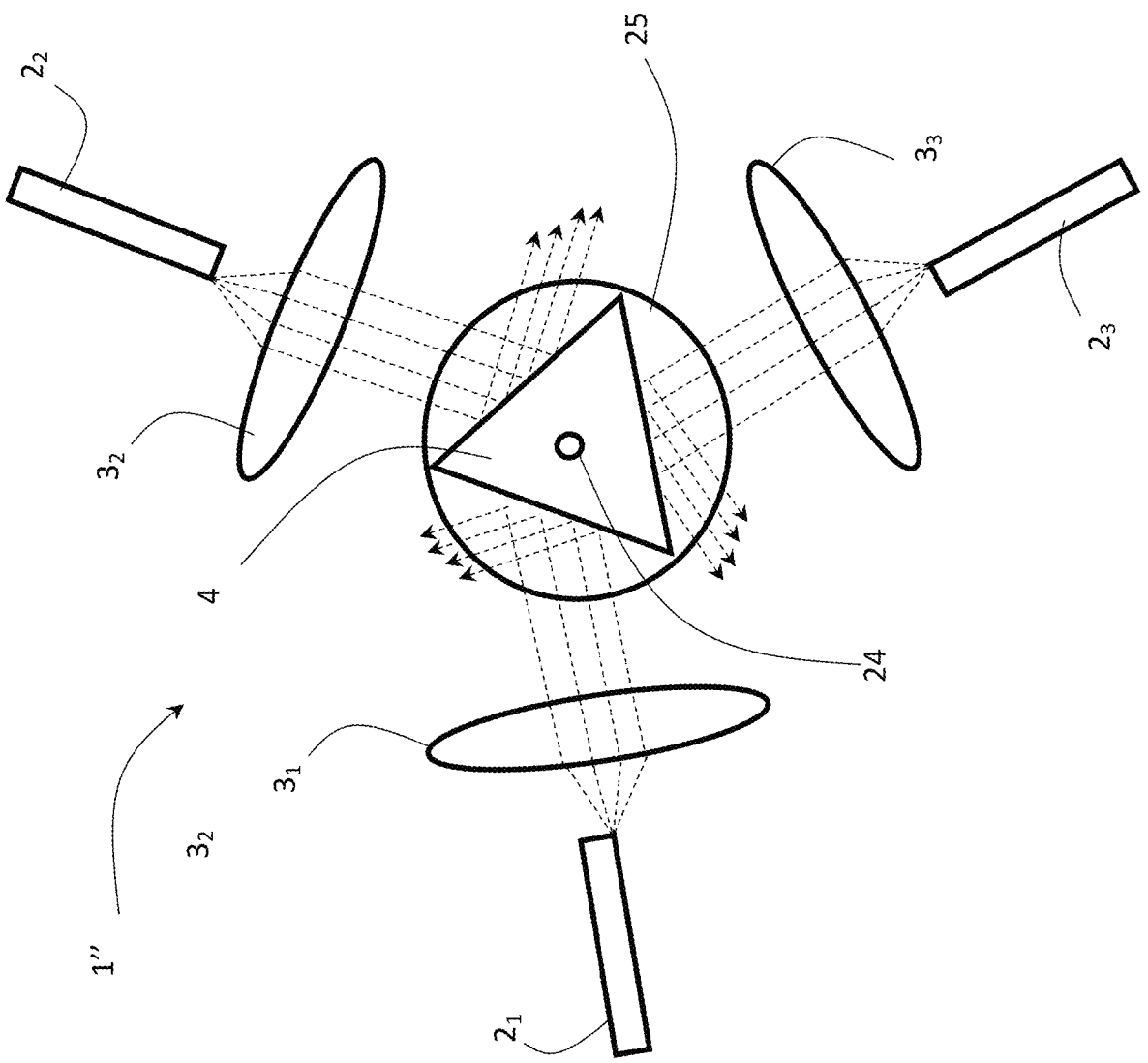
FIG. 9 is a side view of another example embodiment of the present disclosure.

FIG. 9 illustrates an exemplary optical emitter device 1" in which three sets of optical emitter chips $2_1$ to $2_n$ and corresponding lens systems $3_1$ to $3_n$ share a single triangular polygonal reflecting mirror 4.

The term controller or processor may include a microcontroller or a field-programmable-gate-array (FPGA) including with suitable non-transitory memory for storing the control parameters via computer software.

To control the system, when the spinning motor 25 is a stepper motor, the controller 20 may include a dedicated microcontroller or FPGA controller that send control signals, e.g. pulses, to step the spinning (stepper) motor 25 in fixed increments. Therefore, the microcontroller or the FPGA may immediately determine the instantaneous position, i.e. angle, of the rotating mirror 4 based on the control signals. To avoid asynchronized control over time due to the possibly that the spinning (stepper) motor 25 misses steps, an optical slotted interrupter may be installed in the rotating mirror 4/spinning motor 25 system. An interrupt pin may also be installed on either end of rotating mirror 4, which may slide in and out of the optical slotted interrupter thereby temporarily blocking light detection in the optical slotted interrupter as the spinning motor 25 and/or rotating mirror 4 rotates. Therefore, the optical interrupter will provide a pulse signal to the microcontroller/FPGA for every rotation of the rotating mirror 4 and/or the spinning motor 25.

For all types of spinning motors 25, there may be a dedicated rotary encoder either built-in the spinning motor 25 or an external rotary encoder module that provides the absolute or relative angular position of the rotating mirror 4 to the microcontroller/FPGA.

When the controller 20, e.g. the microcontroller/FPGA, has the angular position of the rotating mirror 4, a correct lidar image may be constructed.

Figure 10:
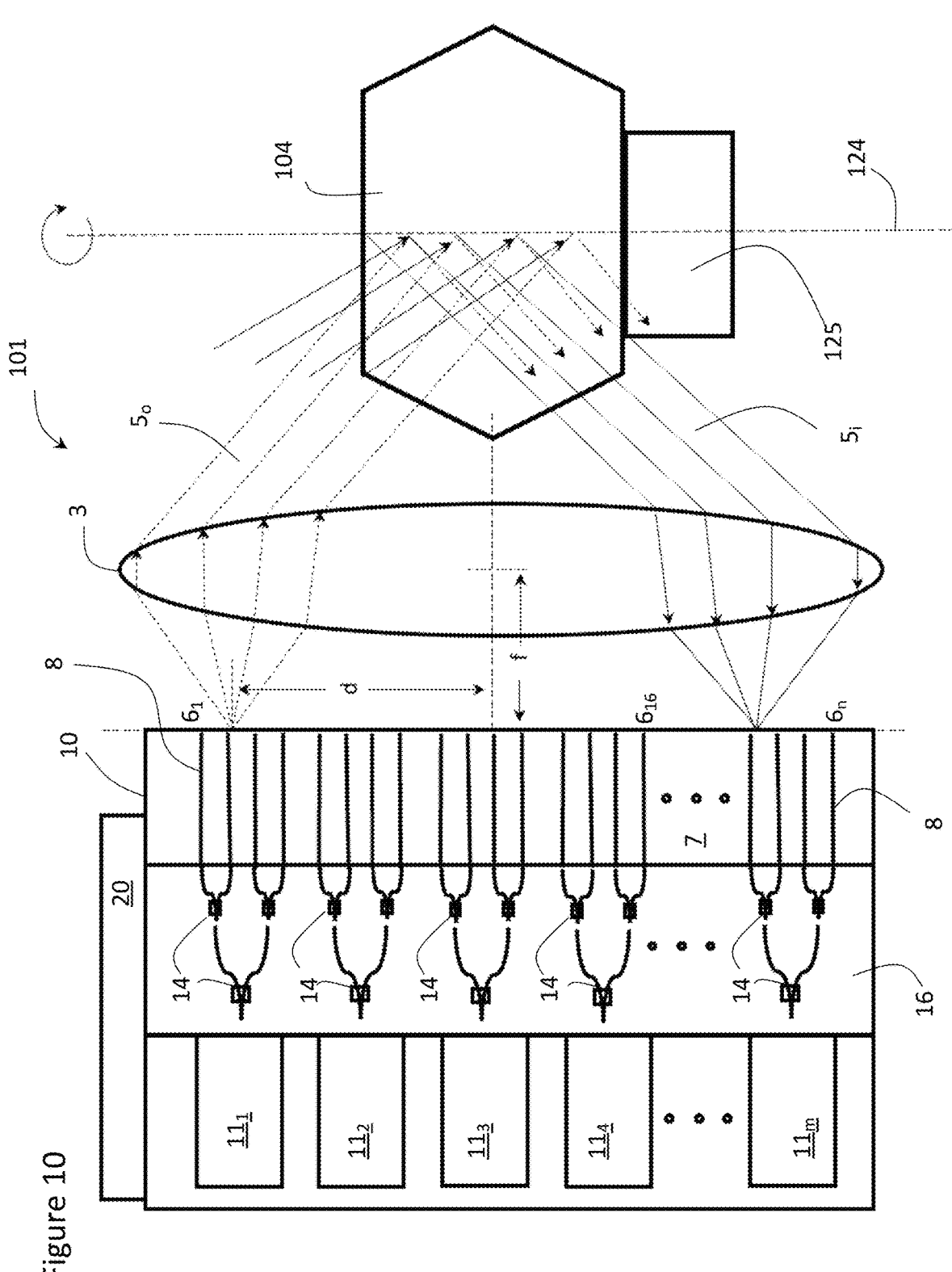
FIG. 10 is an top view in accordance with an example embodiment of the present disclosure.
Figure 11:
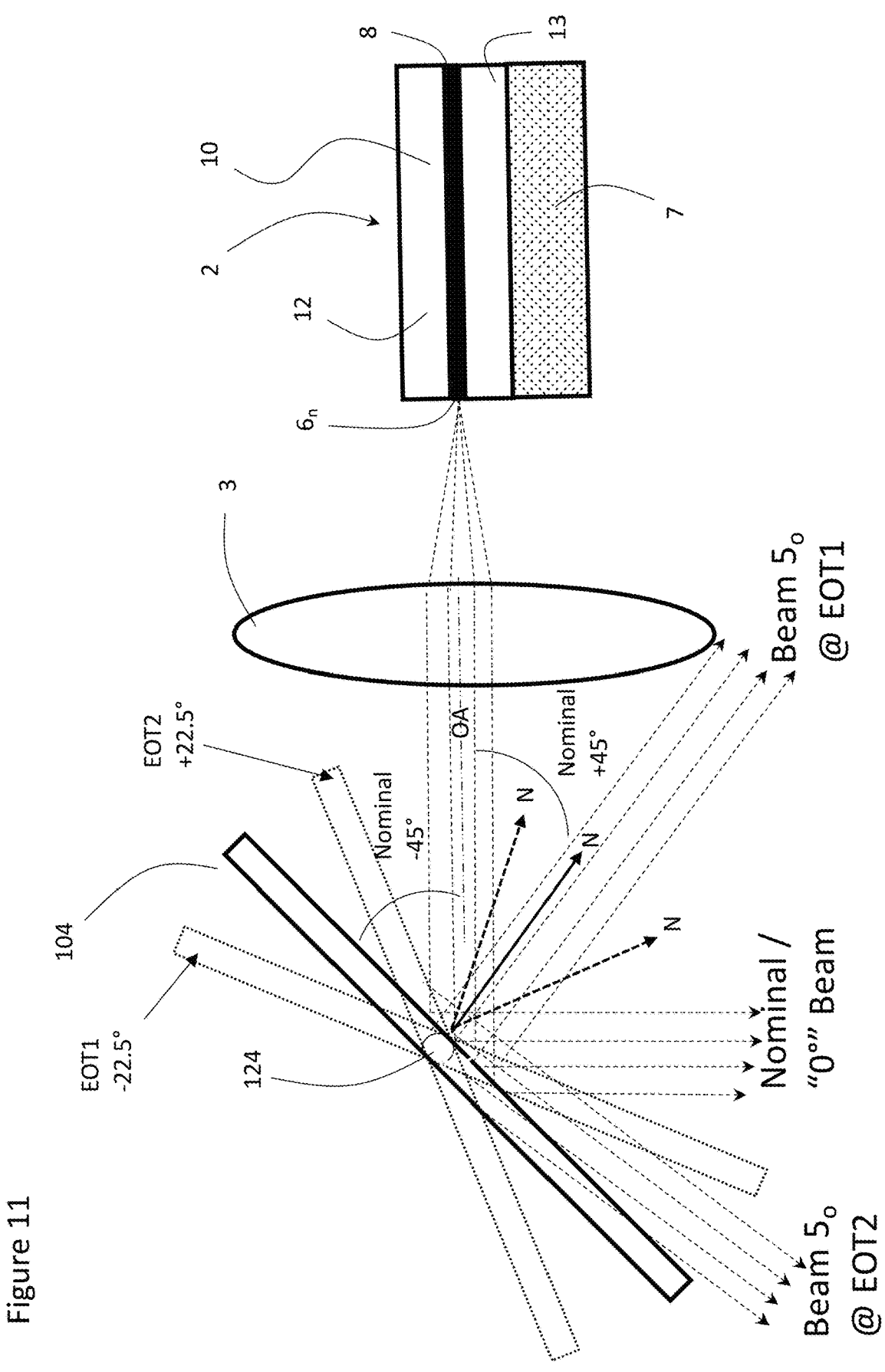
FIG. 11 is a side view of the device of FIG. 10.

With reference to FIGS. 10 and 11, another exemplary embodiment of an optical emitter device 101 comprises: the optical emitter chip 2 and the lens system 3, as hereinbefore described, and a rotating (oscillating) mirror 104, e.g. reflector. As above, for beamforming, one or more highly collimated output beams $5_o$ may be transmitted when the point emitter $6_1$ to $6_n$ from the optical emitter chip 2 is placed proximate to or substantially on the focal plane F of the lens system 3 (infinite conjugation). The reverse propagation is also true based on the reciprocity theorem, whereby a parallel input beam $5_i$, e.g. one of the output beams $5_o$ reflected off of an object, shining on the lens system 3 will focus at a point spot to be captured by one of the point emitters $6_1$ to $6_n$, with a slight spread determined by lens aberration and diffraction. For beam-steering, the far-field beam angle α of the shaped, e.g. substantially collimated or focused, output beam $5_o$ depends on the location of the point emitter $6_1$ to $6_n$ on the focal plane F relative to the longitudinal central optical axis OA of the lens system 3. The beam angle α is governed by the equation: $\alpha=\arctan(d/f)$, where d is the distance from the center of the focal plane, i.e. the point where the optical axis OA coincides with the focal plane F, and f is the focal length of the lens system 3. Therefore, a full LIDAR system may be implemented by placing the optical emitter chip 2 of point emitters $6_1$ to $6_n$ on or near the focal plane F of the lens system 3, then using a controller 20, selectively switch on and off selected and unselected point emitters $6_1$ to $6_n$, respectively, to steer the one or more output beams $5_o$ in the desired directions at the desired beam angles α. The point emitters $6_1$ to $6_n$ may comprise any of the aforementioned point emitters, e.g. as described in FIGS. 3A to 6.

The rotating mirror 104 may be comprised of an oscillating mirror, e.g. a galvanometer optical scanner, comprising a single facet with a single reflective surface, and with a longitudinal axis of rotation 124, which may or may not be aligned with a rotational axis of a spinning motor 125. The spinning motor 125 may be any type of rotary motor, such as a stepper motor, dc motor, or servo motor. The longitudinal axis of rotation 124 may not be aligned to the axis of the spinning motor 125 when the axes are connected with a belt or gear system. The longitudinal axis of rotation 124 of the rotating mirror 104 may be perpendicular to the optical axis OA of the lens system 3 and/or parallel to a first plane in which the emitter array 10 lies. The optical axis OA may lie in a second plane perpendicular to the first plane and perpendicular or normal to the axis of rotation 124. The spinning motor 125 may be driven by an electrical signal comprising a triangular wave, i.e. starting at a minimum voltage (current) at one maximum angle of rotation, increasing substantially linearly to a maximum voltage (when the mirror is substantially perpendicular to the optical axis OA, and then decreasing substantially linearly to the other maximum angle of rotation. The rotating mirror 104 may oscillate at about 2.5 Hz to 50 Hz, preferably about 20 Hz. The rotating mirror 104 may have a width configured to receive 16-256, preferably 32, beams of output light $5_o$ and input beams of light $5_i$. Alternatively, rotating mirror 104 may comprise a micro electromechanical system (MEMS) mirror device, where motor 125 comprises, e.g. an electrostatic, electromagnetic, or piezo actuator.

Direct reflection of the output beam $5_o$ directly back into the point emitter $6_1$ to $6_n$, i.e. the end-fire taper 9, may be prevented, and the field of view (FOV) may be increased, by disposing the longitudinal axis of rotation 124 of the rotating mirror 104 offset, distance t, from the optical axis OA of the lens system 3, i.e. the axis of rotation 124 may not intersect with the optical axis OA. Generally, the unobstructed FOV range begins at a position where the output beam $5_o$ misses the lens system 3 (back reflected) and ends when the output beam $5_o$ begins to clip the edges of the mirror facet.

As detailed above, to reduce the number of light sources and photodetectors required, while maintaining a maximum or desired threshold optical power, the controller 20 may also cycle through a group of the point emitters, e.g. $6_1$ to $6_4$, which are optically coupled to one of the transceivers, e.g. transceiver $11_1$, by turning selected switches 14 on and off to sequentially transmit a different output beam $5_o$ to each of the point emitters, e.g. $6_1$ to $6_4$, in the group. Some or all of the light sources, e.g. some or all of the transceivers $11_1$ to $11_m$, may have a different group of waveguide cores 8 optically coupled thereto, whereby a first subset of output beams $5_o$ may be transmitted simultaneously at a time, i.e. one output beam $5_o$ from each light source transmitted via one of the group of waveguide cores 8 coupled thereto. Then, under control of the controller 20, each light source will sequentially cycle through each of the waveguide cores 8 in the corresponding group of waveguide cores 8 coupled thereto, spending at least a single round trip period switched to each emitter, e.g. $6_1$-$6_4$. The round trip period should be at least as long as the time necessary for the light to travel from the light source of the point emitter, e.g. $6_1$ to $6_4$, to the target and back to the photodetector of the point emitter, e.g. $6_1$ to $6_4$. Accordingly, only a portion of the total number of output beams $5_o$ (and the input beams $5_i$) to cover the full range of beam angles α may be transmitted at one time. The controller 20 may coordinate the light sources, the switching matrix 16, an angular position of the rotating mirror 4, and the photodetectors to transmit and receive each output beam $5_o$ and each input beam $5_i$ sequentially via the first switching matrix 16 and the plurality of first point emitters $6_1$-$6_n$.

There may be dead zones, in which no accurate transmit/return measurements are possible, created as the rotating mirror 104 reaches or surpasses a maximum angle of rotation from the OA, at which points the rotating mirror 104 begins rotating in an opposite direction to scan the point emitters $6_1$ to $6_n$ in the opposite direction. The rotating mirror 104 may oscillates back and forth in opposite directions about the axis of rotation 124 through an angle of about 45°, providing a scanning range or about 90°, with a nominal position in which the rotating mirror 104 is at about a −45° angle from the OA (CW is +), and a normal N is at about a +45° angle with the OA, whereby the output beams $5_o$ are directed at about a 900 from the OA, e.g. out of the page of FIG. 10. At the ends of travel EOT1 and EOT2, the rotating mirror 104 may be at −67.5° and −22.5°, respectively, from the OA, while the normal N may be +22.5° and +67.5°, respectively, from the OA (+/−22.5° from 45° midpoint), as in FIG. 11. Accordingly, the controller processor 20 may activate the switches 14 to cycle through the different waveguide cores 8 in each group of point emitters, e.g. $6_i$-$6_4$ during periods of time when the rotating mirror 104 is in a dead zone or near the end of its travel range. The activation of the switches 14 may be approximately synchronized with the deceleration and acceleration of the rotating mirror 104 at the ends of its travel range.

The controller processor 20 may further alternate during which pass (clockwise or counterclockwise) the light source supplies each point emitter $6_1$ to $6_n$ with light by only activating some, e.g. every other, of the light sources and switches 14. The switching of the alternating channels may also take place during the time the rotating mirror 104 is in a dead zone. Each group of emitters 6; active during a particular mirror sweep creates a sub-frame of pixels collected. By compiling multiple sets of active emitters $6_1$ to $6_n$ the entire scene may be interrogated over multiple clockwise and counterclockwise passes of the rotating mirror 104.

The oscillation rate (cycles per second, or cps) of the rotating mirror 104 depends on the switching scheme; however, the oscillation rate may be the same speed as or less than the LIDAR frame rate, i.e. how long it takes to scan the entire scanning range. For example, for 3 frames/second, multiplied by the number of sub-frames (i.e. groups of emitters $6_i$ switched between), e.g. 2 sub-frames, equals 6 clockwise or counterclockwise sweeps per second, or an oscillation rate of 3 cycles per second. The number of sub-frames can be varied depending on the application or be selected by the user during operation. The instantaneous rotational speed of the mirror 104 is preferably kept less than a threshold speed, at which errors may occur if the sweep is too fast such that the input beam $5_i$ does not reflect back to the same point emitter $6_1$-$6_n$ (or even hitting nothing). Ideally, this means that the motor angular velocity (in degrees per second), e.g. between 360 and 18000 degrees per second, is less than the input beam $5_i$ divergence (in degrees), e.g. between 0.2° and 0.002°, divided by the round-trip time for the light to travel from the lens system 3 to the target and back (in seconds). For example, for a beam divergence of 0.02° and a target 500 m away, the round-trip time would be 3.33 μs, so the mirror would ideally turn more slowly than 0.02 degrees/3.33 μs, i.e. 6000 degrees/s.

Figure 12:
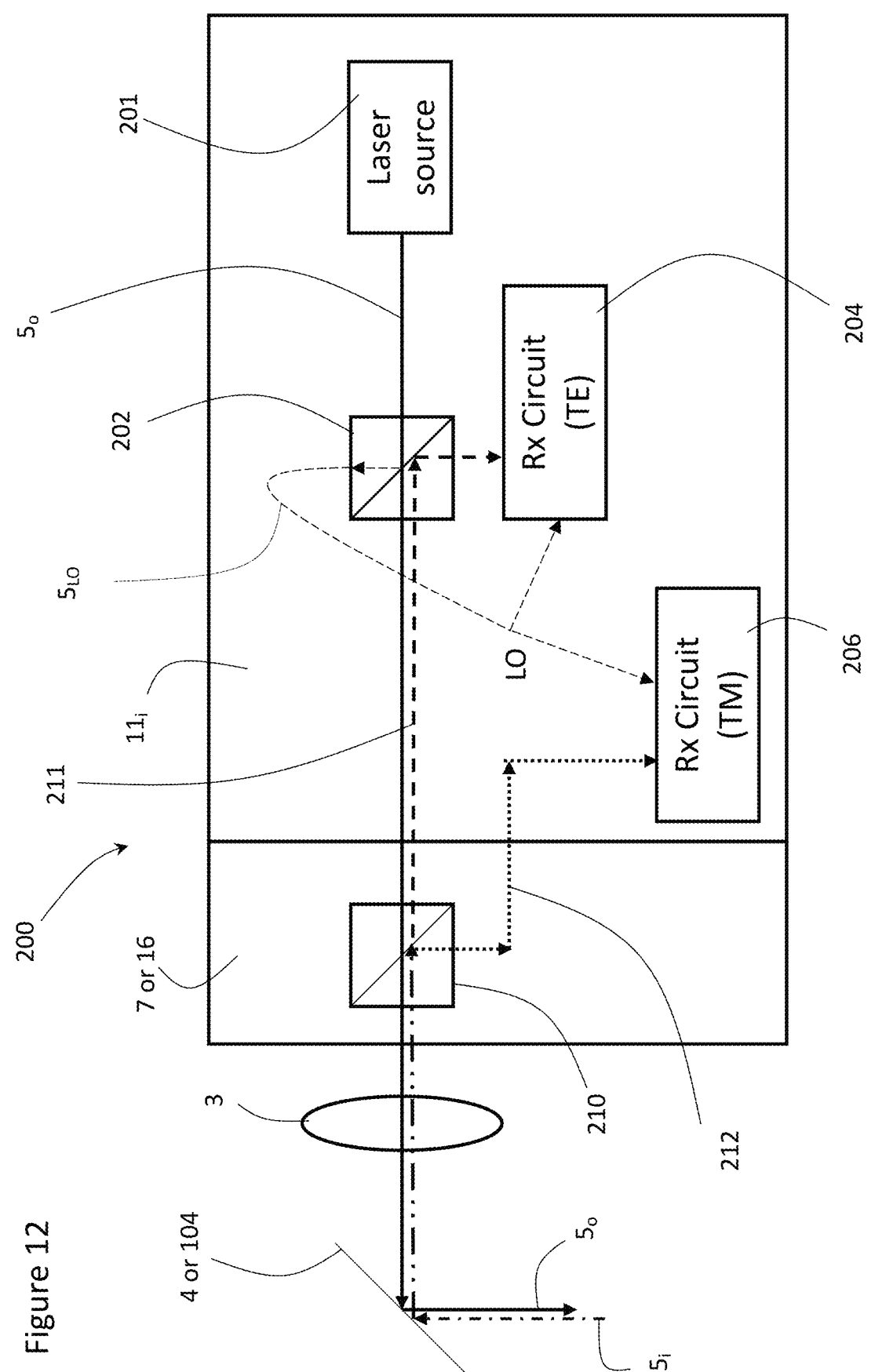
FIG. 12 is a schematic diagram of a transceiver section of any of the aforementioned embodiments.
Figure 13:
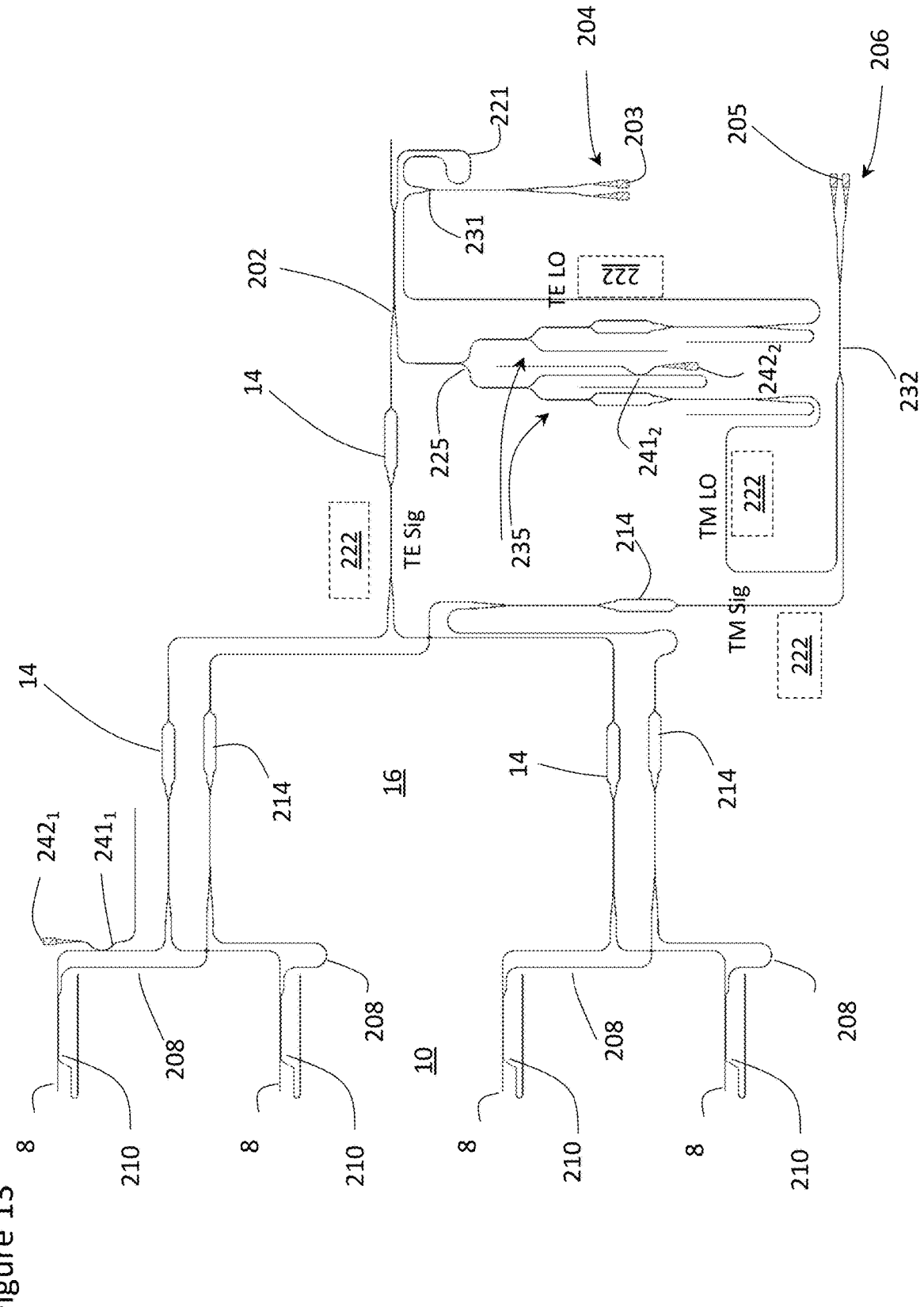
FIG. 13 is an optical waveguide diagram of the transceiver of FIG. 12.

With reference to FIGS. 12 and 13, some or all of the aforementioned example optical devices may include a polarization duplexing system 200 for measuring both polarization mode components of returning input beams $5_i$. The output beams $5_o$ may be launched with a single polarization mode, e.g. TE (transverse electric) mode; however, due to varying obstacle surface textures, the input beams $5_i$ may return with a first component of TE mode and a second component of the orthogonal polarization, i.e. TM (transverse magnetic) mode. In some conventional LIDAR systems the second component would simply be scattered or lost, which, depending on the obstacle surface, may constitute a large portion of the input beams $5_i$.

Each of the aforementioned transceivers $11_1$ to $11_m$ may include a laser source 201 for launching the output beam $5_o$ having a single polarization mode, e.g. TE mode. The output beam $5_o$ may be transmitted through a beam splitter 202, so that a portion, e.g. 40%-60%, preferably 50%/50%, is tapped off to provide local oscillator (LO) light $5_{LO}$ for the first photodetectors 203 in a first photodetector circuit 204. The output beam $5_o$ proceeds to the switching matrix 16, the selected optical waveguide core 8, the selected point emitters $6_1$ to $6_n$, the lens system 3 and the rotating mirror 4 or 104. The input beams of light $5_i$ returns off of the rotating mirror 4 or 104 through the lens system 3 to the selected point emitters $6_1$ to $6_n$, the selected optical waveguide core 8, the switching matrix 16, to the beam splitter 202, which redirects a portion of the input beams of light $5_i$ to the photodetectors 203 in the first photodetector circuit 204.

The polarization duplexing system 200 includes a polarization beam splitter 210 disposed between the point emitters, e.g. $6_1$ to $6_n$, and the transceivers $11_1$ to $11_m$ configured for separating the input beam $5_i$ into a first, e.g. TE mode, component 211 and a second, e.g. TM mode, component

212. The first component 211 may be transmitted to the first photodetectors 203 in the first photodetector circuit 204 (as previously disclosed herein), which provides a first electrical signal to the controller processor 20 corresponding to optical power in the first component 211. The second component 212 may be transmitted to second photodetectors 205 in a second photodetector circuit 206, which provides a second electrical signal to the controller processor 20 corresponding to optical power in the second component. Ideally, the polarization mode of the second component may be converted, e.g. rotated, to the same polarization mode of the first component, e.g. TE mode, to facilitate transmission in the on-chip waveguide cores 8 and switching matrix 16. Accordingly, the polarization beam splitter 210 may comprise a polarization beam splitter/rotator, as is known in the art.

FIG. 13 illustrates a more detailed example of the polarization duplexing system 200 in which four of the optical waveguide cores 8 are illustrated, each with a respective polarization beam splitter 210 with polarization rotating capabilities. As in aforementioned examples, each group, e.g. two pairs, of optical waveguide cores 8 has a first switch 14, enabling the controller processor 20 to select between the two pairs of optical waveguide cores 8, and a second and a third switch 14 enabling the controller processor 20 to select between the optical waveguide cores 8 in each pair, i.e. the corresponding point emitter $6_1$ to $6_n$. For the polarization duplexing system 200, a second set of switches 214 may be provided on the switching matrix 16, and a second set of optical waveguide cores 208 may be provided on the optical emitter array 10 for selecting which of the second components from the input beams of light $5_i$ will be transmitted back to the second photodetector circuit 206 corresponding with the first components selected by the first set of switches 14. Because the physical distance of a first (TE) optical path TE Sig between the polarization beam splitter 210 and the first photodetector circuit 204 for the first component 211 may be different than the physical distance of a second (TM) optical path TM Sig between the polarization beam splitter 210 and the second photodetector circuit 206 for the second component 212, an additional length, e.g. loop, of optical waveguide 221 may be provided in one of the first or second optical paths TE Sig or TM Sig or in the local oscillator optical paths TM LO and TE LO between the beam splitter 202 and the corresponding first and second photodetector circuits 204 and 206. In addition a phase shifter tuner 222 may be provided in the additional length 221 (affecting the TE Sig) or in one of the first or second optical paths TE Sig or TM Sig configured for tuning the optical path length of the first or second optical path TE Sig or TM Sig to ensure the beat tone received on the photodetector circuits 204 and 206 are in-phase. This may be ensured particularly when the relative phase between TE Sig and TE LO is equal to the phase between TM Sig and TM LO, up to a factor of 2 pi. Matching the relative phases provides a more accurate measure when the first and second electrical signals generated from the photodetector circuits 204 and 206 are compared or combined, or when the electrical signals are directly summed after the photodetector circuits 204 and 206. A phase shifter tuner 222 may alternatively or also be positioned in the local oscillators in the photodetector circuits 204 and 206 or in the local oscillator paths TM LO and TE LO for the same purpose.

The local oscillator light $5_{LO}$, split off by the beam splitter 202, may be transmitted along a suitable optical waveguide to a splitter 225, whereby a first portion of the local oscillator light $5_{LO}$ is combined with the first component 211 in a first mixer 231 for transmission to the first photodetectors 203, and a second portion of the local oscillator light $5_{LO}$ is combined with the second component 212 in a second mixer 232 for transmission to the second photodetectors 205. A variable attenuator or a pair of variable attenuators 235 may be provided between the beam splitter 202 and the first and second mixers 231 and 232 for attenuating the local oscillator light $5_{LO}$ to ensure the local oscillator light $5_{LO}$ does not overpower the first photodetectors 203 and/or the second photodetectors 205. In the illustrated example, a pair of variable attenuators 235 are provided after the splitter 225, whereby one variable attenuator 235 is provided for the first portion of the local oscillator light $5_{LO}$ and a second variable attenuator 235 is provided for the second portion of the local oscillator light $5_{LO}$.

A first tap $241_1$, e.g. 1%-5% optical splitter, and a first monitor photodetector $242_1$ may be provided in one of the first or second optical paths, e.g. in one of the optical waveguide cores 8, for monitoring the output beam $5_o$ and/or the input beam $5_i$. A first monitor electric signal may be sent from the first monitor photodetector $242_1$ to the controller processor 20, whereby the controller processor 20 may monitor the output beam $5_o$ and/or the input beam $5_i$, and provide adjustment to other components, e.g. the light source 201 or the switches 14. Similarly, a second tap $241_2$, e.g. 1%-5% optical splitter, and a second monitor photodetector $242_2$ may be provided before and/or after one or more of the variable attenuators 235 for monitoring the first portion of the local oscillator light $5_{LO}$ and/or the second portion of the local oscillator light $5_{LO}$. Second and/or third monitor electric signals may be sent from the second monitor photodetector $242_1$ to the controller processor 20, whereby the controller processor 20 may monitor the first portion of the local oscillator light $5_{LO}$ and/or the second portion of the local oscillator light $5_{LO}$, and provide adjustment to variable attenuator(s) 235.

The controller processor 20 may simply add the optical power of the first component, e.g. the first electric signal, to the optical power of the second component, e.g. the second electric signal, to provide a total sum of the optical power (combined electrical signal) of the input beam $5_i$. In addition or alternatively, the controller processor 20 may utilize the second electric signal or a comparison of the second electric signal to the first electric signal to monitor or characterized the surface from which the input beam $5_i$ reflected off of. For example, vehicles and signs including highly reflective, e.g. metallic, surfaces may reflect relatively small portions of light that are converted to the second polarization mode. Accordingly, the highly reflective surface may be characterized by a relatively low magnitude second electric signal or a relatively low magnitude ratio of second electric signal to first electric signal. On the contrary, concrete buildings or asphalt roads, including rough and poorly reflective surfaces, may reflect relatively larger portions of light that are converted to the second polarization mode. Accordingly, the poorly reflective surface may be characterized by a relatively high magnitude second electric signal or a relatively high magnitude ratio of second electric signal to first electric signal.

Figure 14:
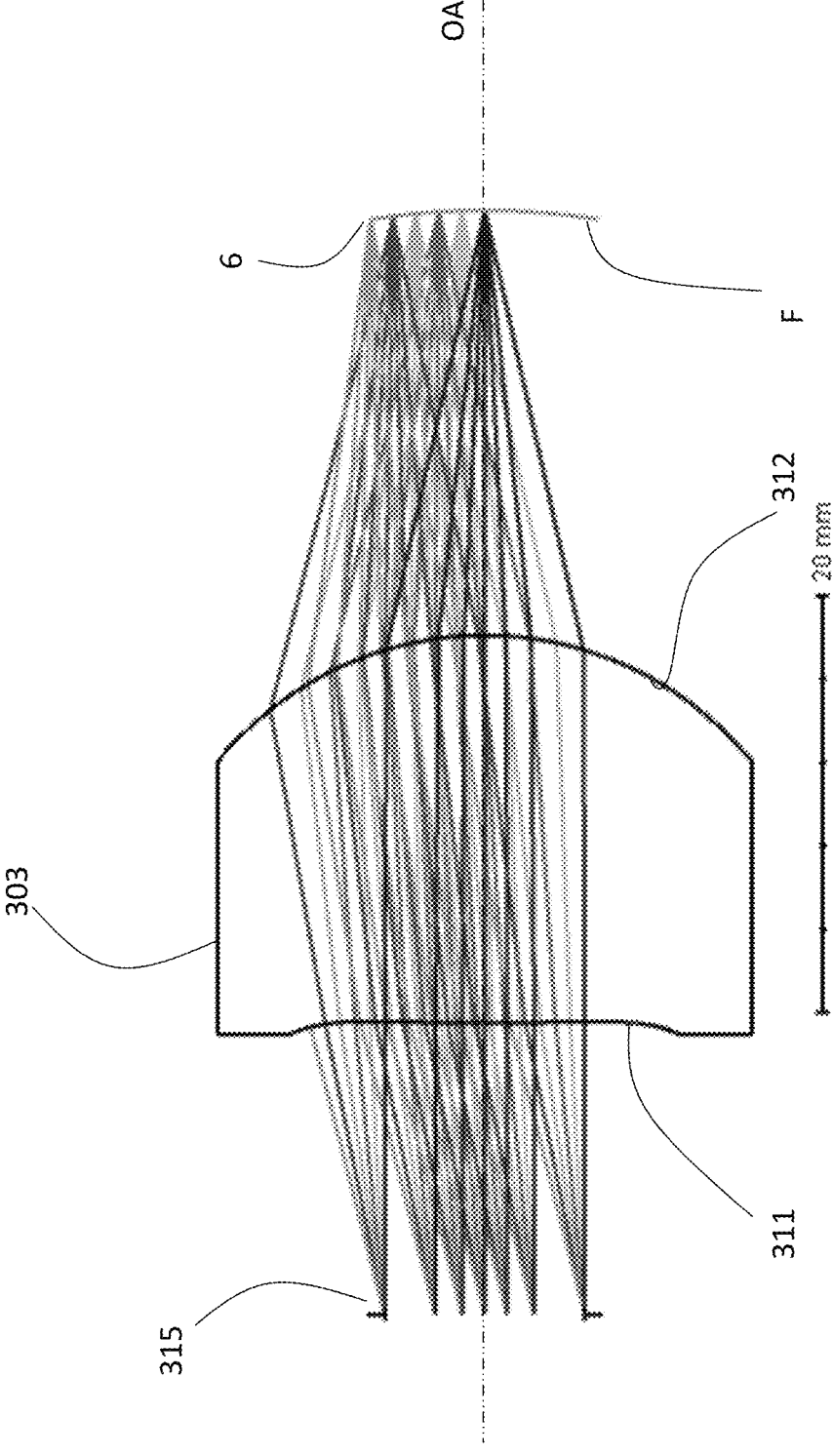
FIG. 14 is a cross section of a lens for some of the aforementioned embodiments.
Figure 15:
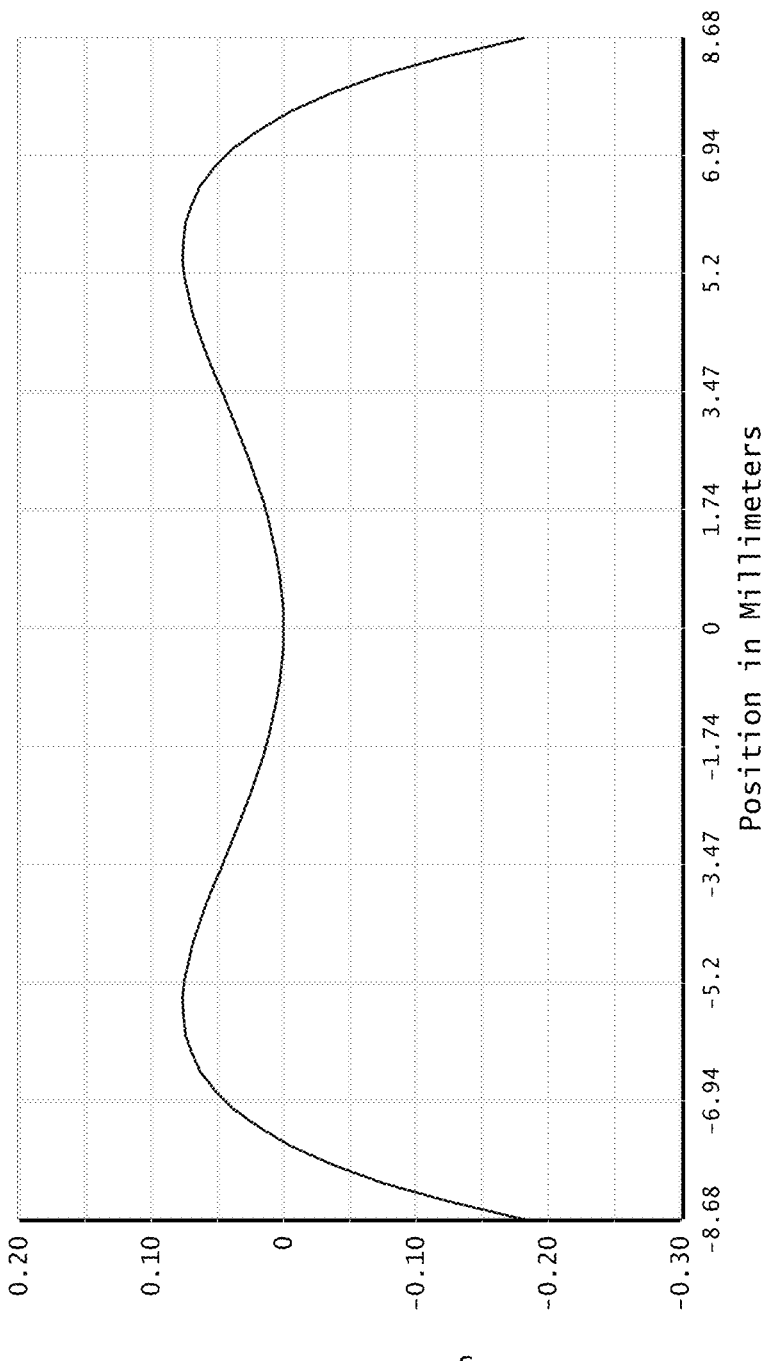
FIG. 15 is a graph of Sag (mm) vs position from optical axis of the lens of FIG. 14.

With reference to FIG. 14, an exemplary lens system 3 for use in some or all of the examples in which the end-fire tapers 9 are disposed such that each point emitter $6_1$ to $6_n$ is substantially along or proximate to a curved focal plane F, may consist of a single element curved facet lens 303. The single element lens 303, may be predominantly meniscus shaped, with both a front surface 311 and a back surface 312 being aspheric.

An optical stop 315 in front of lens 303 is preferably >7 mm, preferably between 7 mm and 30 mm, and more preferably between 12 mm and 16 mm distance between the stop 315 and the lens 303 to provide mechanical clearance for the rotating mirror 4 or 104.

The front surface 311 (nearest the stop 315) may be strongly aspheric, substantially flat near the optical axis OA and concave near the outer edges. The front surface 311 may be regarded as substantially flat even if at some points near the optical axis OA it has locally convex curvature. The back surface 312 (nearest the image) generates most of the optical power, and is strongly convex with a radius of curvature of 10 mm-20 mm, preferably about 15 mm. The image surface, i.e. the focal plane F, is concave towards lens 303.

Center thickness of the lens 303 may be greater than 10 mm, preferably between 15 mm and 25 mm, more preferably about 19 mm. With insufficient center thickness aberrations become difficult to correct, particularly for wide fields of view, and the required curvature of the front surface 311 and the back surface 312 becomes extreme and difficult to manufacture.

The thicknesses, distances, and radii described here are preferable for a lens system with overall focal length of 22 mm, and would scale linearly with the focal length for other design focal lengths, e.g. the center thickness may be greater than 5 mm and preferably between 7.5 mm and 12.5 mm for a system focal length of 11 mm. The center thickness may be equal to or greater than one half of a focal length of the first lens 303.

The optical material of the lens 303 can be glass or plastic, preferably with a negative thermo-optic coefficient, e.g. dn/dt approx. $-5\times10^{-6}/°$ C. The lens 303 may have an index of refraction, n>1.6, preferably n>1.75, and even more preferably between 1.7 and 1.8. The lens housing may have a positive coefficient of thermal expansion, e.g. Aluminum, $23.6\times10^{-6}/°$ C. Accordingly, the combination of the negative thermo-optic coefficient material in the lens 303 and the positive thermo-optic coefficient material in the housing, makes the focal shift of the lens 303 approximately zero across a desired temperature range, e.g. from $-40°$ C. to $105°$ C. Accordingly, the focal plane F may not substantially move with temperature changes.

The single element lens 303 may be designed without regard to dispersion or chromatic aberration if the optical emitter device 1, 1', 1" or 101 operates at a single wavelength or a small range of wavelengths in the near-IR, e.g. between 1200 and 1700 nm.

Designing an optical emitter device 1, 1', 1" or 101 to use a single lens element 303 as opposed to a plurality of elements is desirable because it reduces mechanical constraints in the device, e.g. the alignment and centration of multiple optical elements and the precision machining of a housing to effect such alignment. However, removing optical aberrations, particularly spherical aberration and coma, is more difficult with fewer surfaces. Employing aspheric surfaces in a design that is roughly concentric about the stop 315 allows the minimization of these aberrations. The curved focal plane F also removes the need to correct for field curvature of the optical system, which otherwise would usually require more lens elements.

Numerical data of an example single element lens 303 is shown below in units of mm with reference to FIG. 14, where the coefficients $A_2$, $A_4$, $A_6$, $A_8$, $A_{10}$, and $A_{12}$ are aspheric coefficients for the surface Sag z (i.e. the displacement in the optical axis direction) for a given radial distance from the optical axis r, where c is the inverse of the spherical radius of curvature, and where k is the conic constant, according to the equation:

$$z = \frac{cr^2}{1 + \sqrt{1 - (1+k)c^2 r^2}} + A_2 r^2 + A_4 r^4 + A_6 r^6 + A_8 r^8 + A_{10} r^{10} + A_{12} r^{12}$$

Example Lens System Data

| Focal Length | 22 mm |
|---|---|
| f/# | 2.2 |
| Full-angle field of view | 30 degrees |
| Design wavelength | 1550 nm |

Example Surface Data

| Surface | 315 (Stop) | 311 | 312 | 6 (Image) |
|---|---|---|---|---|
| Radius | ∞ | 105.38 | −17.69 | −37.24 |
| Distance to next surface | 14 | 18.72 | 20.32 | |
| Index (n$_d$) | | 1.778 | | |
| Abbe Number (v$_d$) | | 23.91 | | |
| k | | 0 | 0 | |
| A$_2$ | | 6.07E−05 | −5.85E−06 | |
| A$_4$ | | −6.07E−05 | 4.90E−06 | |
| A$_6$ | | −2.59E−07 | −1.43E−08 | |
| A$_8$ | | 3.71E−10 | −4.41E−11 | |
| A$_{10}$ | | −3.26E−11 | −1.30E−13 | |
| A$_{12}$ | | 0 | 1.23E−15 | |

While the dimensions of the lens system as described above are suitable for a focal length of 22 mm.

The foregoing description of one or more example embodiments has been presented for the purposes of illustration and description. It is not intended to be exhaustive or to limit the invention to the precise form disclosed. Many modifications and variations are possible in light of the above teaching. It is intended that the scope of the disclosure be limited not by this detailed description.

We claim:

1. An optical emitter device comprising:

a first emitter array comprising a plurality of first point emitters, each respective first point emitter configured to emit a respective first beam of output light, and configured to receive a respective first beam of input light;

a first lens system configured to shape and direct each respective first beam of output light and each respective first beam of input light based on a position of each respective first point emitter relative to a first optical axis of the first lens system;

a rotating reflector configured to redirect each respective first beam of output light outwardly at an angle to the first optical axis, and configured to redirect each respective first beam of input light towards the first emitter array;

at least one light source for generating the respective first beams of output light;

a first photodetector circuit for detecting the first beams of input light received by the plurality of point emitters;

a beam splitter for directing the respective first beams of output light to the plurality of point emitters and the respective first beams of input light to the first photodetector circuit;

a second photodetector circuit; and a polarization beam splitter for splitting the first beams of input light into a first sub-beam having a first polarization mode for transmission to the first photodetector circuit, and a second sub-beam having a second polarization mode for transmission to the second photodetector circuit.

2. The optical emitter device according to claim 1, wherein the first emitter array lies in a first plane substantially parallel to an axis of rotation of the rotating reflector.

3. The optical emitter device according to claim 2, wherein the first optical axis of the first lens system lies in a second plane that is perpendicular to the first plane and normal to the axis of rotation of the rotating reflector.

4. The optical emitter device according to claim 1, wherein the rotating reflector comprises an oscillating reflective surface rotating about an axis of rotation in a first direction and in a second direction opposite to the first direction.

5. The optical emitter device according to claim 4, wherein the rotating reflector rotates between 45° in the first direction from a nominal position and 45° in the second direction from the nominal position.

6. The optical emitter device according to claim 4, wherein the axis of rotation is offset from the first optical axis.

7. The optical emitter device according to claim 4, wherein the axis of rotation is perpendicular to the first optical axis of the first lens system.

8. The optical emitter device according to claim 1, wherein the beam splitter is also configured to direct a portion of the respective first beams of output light to the first photodetector circuit as local oscillator light.

9. The optical emitter device according to claim 1, further comprising a first switching matrix configured for selectively directing the respective first beams of output light to one of the plurality of point emitters, and configured for selectively directing the respective first beams of input light to the first photodetector circuit.

10. The optical emitter device according to claim 9, further comprising a controller configured to coordinate the at least one light source, the first switching matrix, an angular position of the rotating reflector, and the first photodetector circuit to transmit each first beam of output light and receive each first beam of input light sequentially via the first switching matrix and the plurality of first point emitters.

11. The optical emitter device according to claim 1, further comprising a polarization rotator for converting the second polarization mode of the second sub-beam to the first polarization mode.

12. The optical emitter device according to claim 1, further comprising:

a first switching matrix configured for selectively directing the respective first beams of output light to one of the plurality of point emitters, and configured for selectively directing the first sub-beams to the first photodetector circuit;

a second switching matrix configured for selectively directing the second sub-beams to the second photodetector circuit; and a controller configured to coordinate the at least one light source, the first switching matrix, the second switching matrix, an angular position of the rotating reflector, the first photodetector circuit and the second photodetector circuit to transmit each first beam of output light to the plurality of first point emitters, and to receive each first sub-beam at the first photodetector circuit and each second sub-beam at the second photodetector circuit.

13. The optical emitter device according to claim 1, further comprising an additional length of optical waveguide in a first optical path between the polarization beam splitter and the first photodetector circuit or in a second optical path between the polarization beam splitter and the second photodetector circuit to ensure the first optical path and the second optical path have a same distance.

14. The optical emitter device according to claim 1, wherein the beam splitter is also configured to direct a first portion of the respective first beams of output light to the first photodetector circuit as first local oscillator light, and a second portion of the respective first beams of output light to the second photodetector circuit as second local oscillator light; and further comprising a phase shifter in at least one of: the first local oscillator, the second local oscillator, a third optical path between the beam splitter and the first photodetector circuit or in a fourth optical path between the beam splitter and the second photodetector circuit, configured to substantially equalize a first relative phase between the first sub-beam and the first local oscillator light, and a second relative phase between the second sub-beam and the second local oscillator light.

15. An optical emitter device comprising:

a first emitter array comprising a plurality of first point emitters, each respective first point emitter configured to emit a respective first beam of output light, and configured to receive a respective first beam of input light;

a first lens system configured to shape and direct each respective first beam of output light and each respective first beam of input light based on a position of each respective first point emitter relative to a first optical axis of the first lens system; and a rotating reflector configured to redirect each respective first beam of output light outwardly at an angle to the first optical axis, and configured to redirect each respective first beam of input light towards the first emitter array, wherein an outer end of at least some of the plurality of first point emitters are disposed substantially at a first focal plane of the first lens system, wherein the first focal plane of the first lens system comprises a substantially curved section; and wherein the outer end of at least some of the plurality of first point emitters is disposed proximate to the first focal plane, and wherein the first lens system consists of a single lens including:

a front aspheric surface; and a back substantially convex aspheric surface; and a center thickness greater than one half of a focal length of the first lens system.

16. The optical emitter device according to claim 15, wherein the first lens system comprises of a material with a negative thermo-optic coefficient, and a lens housing with a positive thermal expansion, such that the focal plane does not substantially move with temperature.

* * * * *